United States Patent
Fujino et al.

(10) Patent No.: US 11,851,550 B2
(45) Date of Patent: Dec. 26, 2023

(54) SEALANT FILM

(71) Applicant: TOYOBO CO., LTD., Osaka (JP)

(72) Inventors: Hidetoshi Fujino, Inuyama (JP); Sakie Yamauchi, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 159 days.

(21) Appl. No.: 17/432,788

(22) PCT Filed: Feb. 19, 2020

(86) PCT No.: PCT/JP2020/006450
§ 371 (c)(1),
(2) Date: Aug. 20, 2021

(87) PCT Pub. No.: WO2020/175260
PCT Pub. Date: Sep. 3, 2020

(65) Prior Publication Data
US 2022/0127440 A1    Apr. 28, 2022

(30) Foreign Application Priority Data

Feb. 27, 2019 (JP) .................... 2019-033913
Oct. 30, 2019 (JP) .................... 2019-197514

(51) Int. Cl.
*B32B 27/06* (2006.01)
*C08L 23/06* (2006.01)
(Continued)

(52) U.S. Cl.
CPC .............. *C08L 23/06* (2013.01); *B32B 27/08* (2013.01); *B32B 27/16* (2013.01); *B32B 27/32* (2013.01);
(Continued)

(58) Field of Classification Search
CPC .......... C08L 23/04; C08L 23/06; C08L 23/08; C08L 23/0807; C08L 23/0815;
(Continued)

(56) References Cited

U.S. PATENT DOCUMENTS

2014/0023753 A1    1/2014   Akutsu et al.
2019/0352485 A1*  11/2019   Yamamoto ........... C08G 63/183

FOREIGN PATENT DOCUMENTS

JP    H08-337267 A    12/1996
JP    2000-355362 A   12/2000
(Continued)

OTHER PUBLICATIONS

Machine translation of JP 2018-123174 (Year: 2018).*
(Continued)

*Primary Examiner* — Zachary M Davis
(74) *Attorney, Agent, or Firm* — Leydig, Voit & Mayer, Ltd.

(57) ABSTRACT

The present invention provides a film and/or a packaging bag from which contents that may be viscous are easily brought out, and exhibiting enough heat seal properties as well as superior anti-blocking effect and slipperiness. The sealant film has a seal layer consisting of a resin composition including the following (a) and (b), and the film satisfies the following (1) to (3). (a) Polyolefin-based resin; and (b) Silylated polyolefin resin, (1) An abundance ratio (Si/C) of silicon atoms Si to carbon atoms C included in the seal layer of 0.001 or more and 0.02 or less; (2) An abundance ratio (Si/C) of silicon atoms Si to carbon atoms C present at a surface of the seal layer of 0.05 or more and 0.2 or less; and (3) An arithmetic average roughness Ra of a surface of the seal layer of 0.07 μm or more and 0.5 μm or less.

14 Claims, 4 Drawing Sheets

(51) Int. Cl.
    *B32B 27/08* (2006.01)
    *B32B 27/16* (2006.01)
    *B32B 27/32* (2006.01)
    *B65D 65/40* (2006.01)
    *C08J 5/18* (2006.01)
    *C09K 3/10* (2006.01)

(52) U.S. Cl.
    CPC ............... *B65D 65/40* (2013.01); *C08J 5/18* (2013.01); *C09K 3/1018* (2013.01); *B32B 2270/00* (2013.01); *B32B 2272/00* (2013.01); *B32B 2307/414* (2013.01); *B32B 2307/538* (2013.01); *B32B 2307/54* (2013.01); *B32B 2307/7265* (2013.01); *B32B 2307/732* (2013.01); *B32B 2439/06* (2013.01); *C08J 2323/06* (2013.01); *C08J 2423/26* (2013.01); *C08J 2483/04* (2013.01); *C08L 2203/162* (2013.01); *C08L 2205/025* (2013.01); *C08L 2205/035* (2013.01); *C09K 2003/1084* (2013.01); *C09K 2200/047* (2013.01); *C09K 2200/0447* (2013.01); *C09K 2200/062* (2013.01); *C09K 2200/0685* (2013.01)

(58) Field of Classification Search
    CPC .......... C08L 23/10; C08L 23/12; C08L 23/14; C08L 23/142; C08F 10/00; C08F 10/02; C08F 10/04; C08F 10/06; C08F 110/00; C08F 110/02; C08F 110/04; C08F 110/06; C08F 210/00; C08F 210/02; C08F 210/04; C08F 210/06
    See application file for complete search history.

(56) References Cited

FOREIGN PATENT DOCUMENTS

| JP | 2001-048229 A | 2/2001 |
| JP | 3539723 B2 | 7/2004 |
| JP | 5105035 B2 | 12/2012 |
| JP | 2014-177541 A | 9/2014 |
| JP | 2014-223752 A | 12/2014 |
| JP | 2015-024548 A | 2/2015 |
| JP | 2015-025051 A | 2/2015 |
| JP | 5990131 B2 | 9/2016 |
| JP | 2018-123174 A | 8/2018 |

OTHER PUBLICATIONS

Intellectual Property India, Examination Report in Indian Patent Application No. 202147042061 (dated Feb. 2, 2023).
European Patent Office, Extended European Search Report in European Patent Application No. 20762330.7 (dated Oct. 21, 2022).
Japanese Patent Office, International Search Report in International Patent Application No. PCT/JP2020/006450 (dated May 19, 2020).
China National Intellectual Property Administration, First Office Action in Chinese Patent Application No. 202080016665.5 (dated Feb. 22, 2023).
Zhao, Modern Mechanical Wear and Its Engineering Technologies, Huazhong University of Science and Technology Press, pp. 33-34 (Apr. 30, 2018).
China National Intellectual Property Administration, Second Office Action in Chinese Patent Application No. 202080016665.5 (dated Aug. 26, 2023).

\* cited by examiner

SEM micrographs of the seal layer surface

Example 4 | Comparative example 5

Mapping photographs resulting from elemet analysis of the seal layer

Example 4 | Comparative example 5

TEM micrographs of a cross-section of the seal layer

Example 4

Comparative example 5

Enlarged view of a part of the above micrograph

Evaluation of likelihood of compound deposition on the seal layer surface

Example 4

Comparative example 5

SEALANT FILM

TECHNICAL FIELD

The present invention relates to a sealant film and a laminate using the same. In particular, the present invention relates to a sealant film and a packaging bag of a laminate using the same that is superior in liquid-repellent properties and heat seal properties, as well as slipperiness and blocking properties.

BACKGROUND ART

Since a packaging bag composed of a plastic film is lightweight and superior in airtightness, and transparent with high strength to have excellent handleability, it has been widely used as a package for foods and drugs, which are composed of solid-state materials, liquid-state materials, powder-state materials, paste-like materials, viscid materials, and mixtures thereof.

However, it is empirically widely known that when contents such as foods and drugs are brought out from a packaging bag, it is difficult for the contents such as liquid-state materials, paste-like materials, and viscid materials showing viscosity to be brought out because the contents are likely to adhere to the inside of the packaging bag. In addition, disposal of packaging bags having residual contents may lead to sanitary problems.

In order to solve these problems, a film having a surface to which a surfactant is applied and a film into which a surfactant is kneaded have been proposed (for example, see Patent documents 1, 2), however, they are hardly successful in making it easy for the contents to be brought out, and they also have problems that heat seal strength is reduced.

A film including silicone resin or silicone oil to improve liquid-repellent properties has also been proposed (for example, see Patent documents 3, 4), however, they fail in showing enough liquid-repellent properties.

In addition, a film composed of silylated polyolefin to improve liquid-repellent properties has also been proposed (for example, see Patent documents 5, 6, 7).

However, due to its inferiority in slipperiness and anti-blocking effect, films and laminates disclosed in the Patent documents 5, 6, and 7 are inferior in productivity and handleability.

RELATED ART DOCUMENT

Patent Document

Patent document 1: JP 2000-355362 A
Patent document 2: JP 2001-48229 A
Patent document 3: JP H08-337267 A
Patent document 4: JP 3539723 B
Patent document 5: JP 5990131 B
Patent document 6: JP 2014-177541 A
Patent document 7: JP 2015-024548 A

SUMMARY OF THE INVENTION

Problems to be Solved by the Invention

The present invention has been made considering the above technical background, and the objective of the present invention is to provide a film and/or a packaging bag from which contents that may be viscous are easily brought out, and exhibiting enough heat seal properties as well as superior anti-blocking effect and slipperiness.

Means for Solving the Problems

The present inventors carried out intensive studies considering the aforementioned circumstances, and found that the aforementioned problems can be solved by a film having a resin composition including polyolefin-based resin, a silylated polyolefin, a fatty acid ester or a fatty acid amide, and particles composed of inorganic oxide or synthetic resin, wherein silylated polyolefin is abundant at a surface of a layer composed of the resin composition, and the surface has asperity, to eventually completed the present invention. Namely, the present invention is as follows:

A sealant film, comprising a seal layer consisting of a resin composition including the following (a) and (b), and the film satisfying the following (1) to (3):
(a) polyolefin-based resin; and
(b) silylated polyolefin resin,
(1) an abundance ratio (Si/C) of silicon atoms Si to carbon atoms C included in the seal layer of 0.001 or more and 0.02 or less;
(2) an abundance (Si/C) of silicon atoms Si to carbon atoms C present at a surface of the seal layer of 0.05 or more and 0.2 or less; and
(3) an arithmetic average roughness Ra of a surface of the seal layer of 0.07 μm or more and 0.5 μm or less The second embodiment of the present invention is a sealant film, comprising a seal layer consisting of a resin composition including the following (a) and (b), and the film satisfying the following (3) and (4):
(a) Polyolefin-based resin; and
(b) Silylated polyolefin resin,
(3) An arithmetic average roughness Ra of a surface of the seal layer of 0.07 μm or more and 0.5 μm or less;
(4) The silylated polyolefin described by the following formula

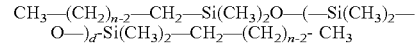

$CH_3-(CH_2)_{n-2}-CH_2-Si(CH_3)_2O-(-Si(CH_3)_2-O-)_d-Si(CH_3)_2-CH_2-(CH_2)_{n-2}-CH_3$ (In the formula, d is an integer of 1 or greater.)
In these cases, the resin composition preferably includes (c) particles comprising inorganic oxide or synthetic resin.

Furthermore, in these cases, the resin composition preferably includes (d) fatty acid ester or fatty acid amide.

Furthermore, in these cases, the film preferably satisfies the following (4).

(4) A ratio of the abundance ratio (Si/C) of silicon atoms Si to carbon atoms C present at a surface of the seal layer to the abundance ratio (Si/C) of silicon atoms Si to carbon atoms C included in the seal layer of 2 or greater.

Furthermore, in these cases, a surface of the seal layer preferably has a blocking value of 200 mN/70 mm or less.

Furthermore, a laminate comprising the sealant film and a base film is preferable.

Effects of the Invention

The present invention can provide a packaging bag from which contents that may be viscous such as viscid materials are easily brought out, and also provide a sealant film and a laminate thereof that exhibit enough heat seal properties as well as superior slipperiness and anti-blocking effect.

Figure 1:
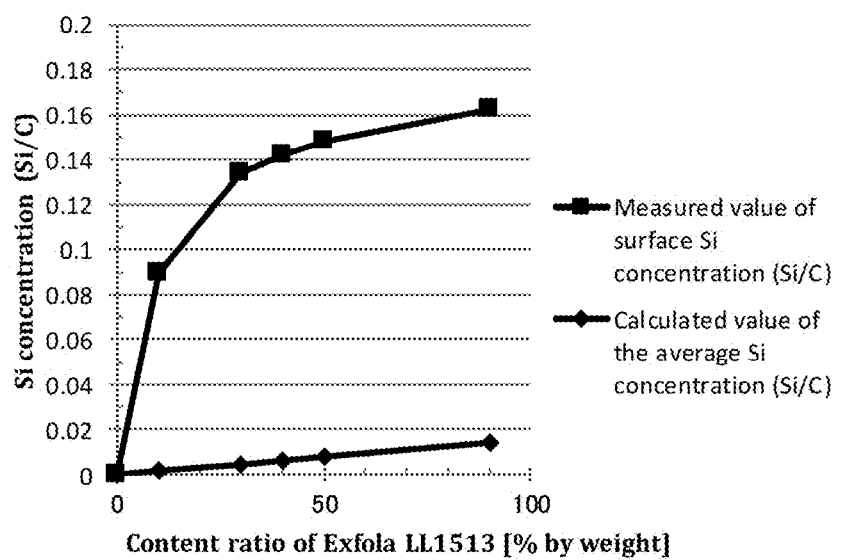
FIG. 1 shows an average Si concentration and a surface Si concentration of films of comparative example 1 and examples 1 to 5.
Figure 2:
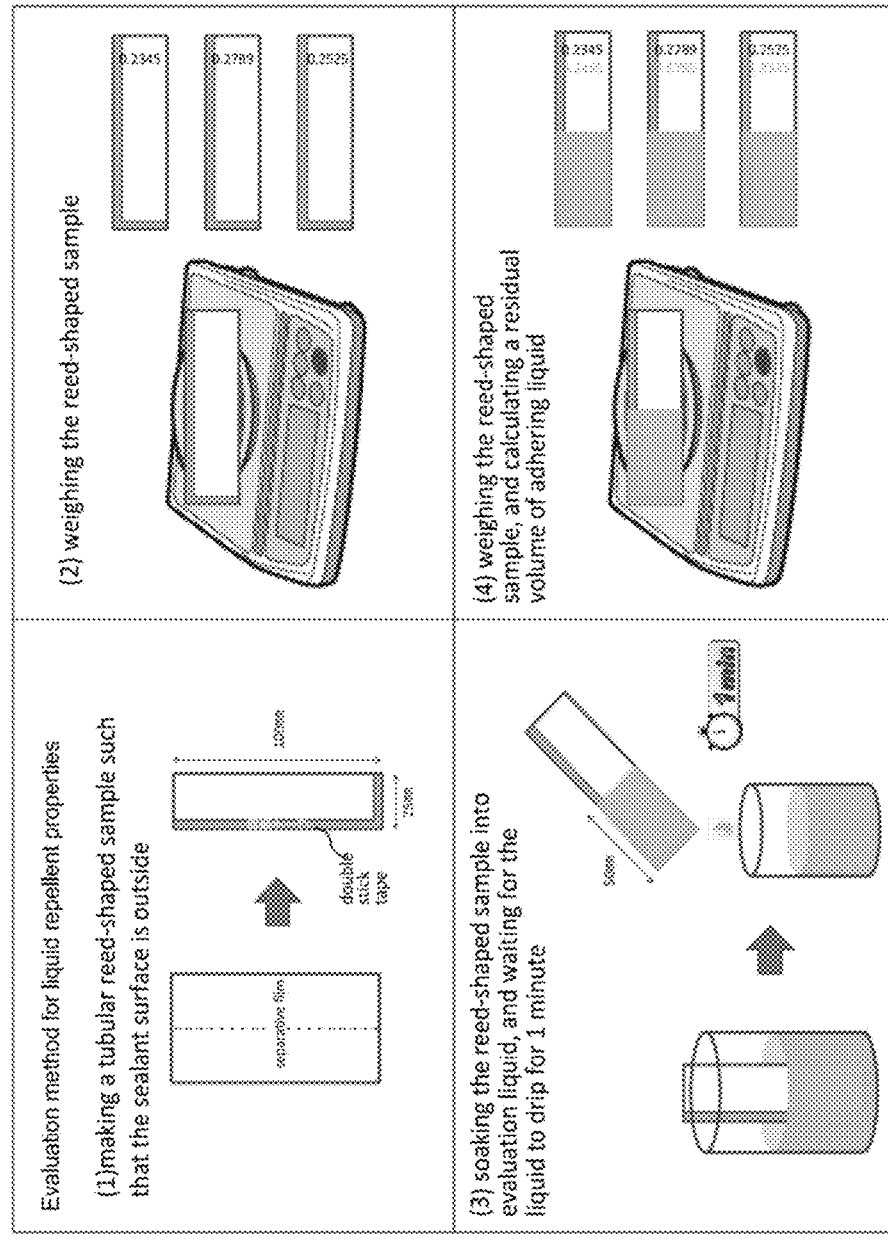
FIG. 2 shows a schematic view of a procedure in evaluation of liquid repellency.

MODE FOR CARRYING OUT THE INVENTION (Seal Layer)

In the present invention, polyolefin resin constituting a seal layer is preferably polyethylene-based resin and polypropylene-based resin.

(Polyethylene-Based Resin)

Polyethylene-based resin used in the present invention is any one of homopolymer of ethylene monomers, copolymer of ethylene monomers and α-olefins, copolymer of ethylene monomers and other monomers, and a mixture thereof.

The α-olefins are exemplified by propylene, butene-1, hexene-1, 4-methyl pentene-1, octene-1, decene-1, and 3-methyl butene-1.

The other monomers are exemplified by monomers of vinyl acetate, (meth)acrylic acid, and (meth)acrylic acid ester.

The Polyethylene-based resin may be random or block copolymer or a mixture thereof that may be crystalline, or low-crystalline or amorphous.

Copolymer of ethylene monomers and α-olefins is generally referred to as high pressure low density polyethylene, linear low density polyethylene, medium density polyethylene, and high density polyethylene.

Such polyethylene-based resin can lead to excellence in heat seal strength, hot tack performance, contaminant heat sealing performance, and impact resistance, however, the amount of the copolymer of ethylene monomers and other monomers is preferably zero or small.

(Polypropylene-Based Resin)

Polypropylene-based resin used in the present invention is any one of homopolymer of propylene monomers, random copolymer and block copolymer of propylene monomers and α-olefins, and a mixture thereof. The α-olefins are exemplified by ethylene, butene-1, pentene-1, hexane-1, 3-methyl butene-1, 4 methyl pentene-1, octene-1, and decene-1.

(Silylated Polyolefin Resin)

Silylated polyolefin resin used in the present invention is obtained by a reaction between a silicon-containing compound having 2 or more SiH groups in a molecule and a vinyl group-containing compound that has a terminal vinyl group and that is a polymer of at least one kind of olefin selected from the group consisting of ethylene, propylene, 1-butene, 1-pentene, and 1-hexene.

Examples of the silicon-containing compound having 2 or more SiH groups include methyl hydrogen polysiloxane described by formula (1), and a compound described by the formula (1) in which a part of or all of methyl groups are substituted by ethyl group, propyl group, phenyl group, trifluoropropyl group, and the like.

$$(CH_3)_3SiO-(-SiH(CH_3)-O-)_a-Si(CH_3)_3 \quad \text{Formula (1)}$$

(In the formula (1), a is an integer of 2 or greater, the upper limit of which is preferably 1000, more preferably 300, and even more preferably 50.)

Other examples of the silicon-containing compound having 2 or more SiH groups include copolymer of dimethylsiloxane-methyl hydrogen siloxane described by formula (2), and a compound described by the formula (2) in which a part of or all of methyl groups are substituted by ethyl group, propyl group, phenyl group, trifluoropropyl group, and the like.

$$(CH_3)_3SiO-(-Si(CH_3)_2-O-)_b-(-SiH(CH_3)-O-)_c-Si(CH_3)_3 \quad \text{Formula (2)}$$

(In the formula (2), b is an integer of 1 or greater, c is an integer of 2 or greater, and the upper limit of the sum of b and c is preferably 1000, more preferably 300, and even more preferably 50.) In addition, in the formula (2), the order of arrangement of the unit of —Si(CH$_3$)$_2$—O— and the unit of SiH(CH$_3$)—O— is not particularly limited, and may be block, random, or statistically random.

Still other examples of the silicon-containing compound having 2 or more SiH groups include methyl hydrogen polysiloxane described by formula (3), and a compound described by the formula (3) in which a part of or all of methyl groups are substituted by ethyl group, propyl group, phenyl group, trifluoropropyl group, and the like.

$$HSi(CH_3)_2O-(-Si(CH_3)_2-O-)_d-Si(CH_3)_2H \quad \text{Formula (3)}$$

(In the formula (3), d is an integer of 1 or greater, the upper limit of which is preferably 1000, more preferably 300, and even more preferably 50.)

Such a compound is, more specifically, exemplified by a compound in which a structure corresponding to its number-average molecular weight is as follows, however, not limited thereto.

HSi(CH$_3$)$_2$O—(—Si(CH$_3$)$_2$—O—)$_5$—Si(CH$_3$)$_2$H
HSi(CH$_3$)$_2$O—(—Si(CH$_3$)$_2$—O—)$_8$—Si(CH$_3$)$_2$H
HSi(CH$_3$)$_2$O—(—Si(CH$_3$)$_2$—O—)$_{18}$—Si(CH$_3$)$_2$H
HSi(CH$_3$)$_2$O—(—Si(CH$_3$)$_2$—O—)$_{80}$—Si(CH$_3$)$_2$H
HSi(CH$_3$)$_2$O—(—Si(CH$_3$)$_2$—O—)$_{230}$—Si(CH$_3$)$_2$H (Vinyl Group-Containing Compound)

A vinyl group-containing compound used in the present invention is obtained by copolymerizing or polymerizing at least one kind of olefin selected from the group consisting of ethylene, propylene, 1-butene, 1-pentene, and 1-hexene.

The vinyl group-containing compound is preferably ethylene-α-olefin copolymer having constituent units derived from ethylene ranging from 81 to 100% by mole, and constituent units derived from α-olefin having 3 to 20 of carbon atoms ranging from 0 to 19% by mole. More preferably the constituent units derived from ethylene ranges from 90 to 100% by mole, and the constituent units derived from α-olefin having 3 to 20 of carbon atoms ranging from 0 to 10% by mole. Especially, the constituent units derived from ethylene is preferably 100% by mole.

In addition, the vinyl group-containing compound preferably has a molecular weight distribution (a ratio of weight-average molecular weight to number-average molecular weight: Mw/Mn) determined by gel permeation chromatography (GPC) ranging from 1.1 to 3.0.

In addition, the vinyl group-containing compound preferably has a number-average molecular weight of 100 or more and 500,000 or less, more preferably 500 or more and 300,000 or less, and even more preferably 1,500 or more and 100,000 or less.

In addition, the vinyl group-containing compound preferably has a melting point of 70° C. or higher and 130° C. or lower.

In addition, the vinyl group-containing compound preferably has vinyl group at the terminal of the main chain, and more preferably has vinyl group only at the terminal of the main chain.

In addition, in the case where the vinyl group-containing compound has vinyl group only at the terminal of the main chain, an unsaturation ratio determined by $^1$H-NMR is 80% by mole or more 99.5% by mole or less, more preferably 90% by mole or more and 99% by mole or less.

(Process for Producing Silylated Polyolefin Resin)

The silylated polyolefin resin used in the present invention is silylated polyolefin resin obtained by reacting the aforementioned vinyl group-containing compound and the silicon-containing compound in the presence of a transition metal catalyst in accordance with the process disclosed in JP 2014-223752 A, or a derivative thereof, or a mixture thereof.

Specific examples of the silylated polyolefin include compounds having a structure described by the formulae (4) to (6), however, combination of the silicon-containing compound and the vinyl group-containing compound is not limited by these examples at all.

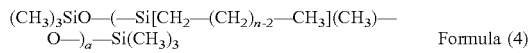

Formula (4)

(In the formula (4), a is an integer of 2 or greater, the upper limit of which is preferably 1000, more preferably 300, and even more preferably 50.)

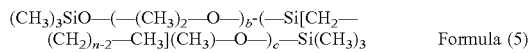

Formula (5)

(In the formula (5), b is an integer of 1 or greater, c is an integer of 2 or greater, and the upper limit of the sum of b and c is preferably 1000, more preferably 300, and even more preferably 50.)

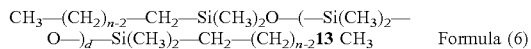

Formula (6)

(In the formula (6), d is an integer of 1 or greater, the upper limit of which is preferably 1000, more preferably 300, even more preferably 50, and particularly preferably 25.)

The silylated polyolefin resin used in the present invention preferably includes 80% by weight or more of block copolymer having polydimethylsiloxane and polyethylene at both ends of the polydimethylsiloxane as described by the formula (6), and particularly preferably 90% by weight or more. In the formula (6), d is an integer preferably of 3 or greater, more preferably 10 or greater.

In the formulae (4) to (6), n is an integer preferably of 100 or greater, more preferably 150 or greater.

The silylated polyolefin resin used in the present invention preferably satisfies the following i) and ii), more preferably satisfies the following i) to iii), and even more preferably satisfies the following i) to iv).

i) The density is in the range of 900 to 1000 kg/m$^3$.
ii) The melting point is in the range of 100 to 140° C.
iii) The number-average molecular weight is in the range of 1,000 to 20,000.
iv) The copolymerizatiop ratio of silicone is in the range of 1 to 50% by weight The formula and molecular weight of the silylated polyolefin resin are identified in the manner described in the examples.

(Particles)

Particles used in the present invention are preferably particles composed of inorganic oxide or synthetic resin.

The particles composed of inorganic oxide or synthetic resin preferably has a weight-average particle diameter of 2 μm or more, more preferably 3 μm or more, and even more preferably 5 μm or more. The weight-average particle diameter is 20 μm or less, more preferably 15 μm or less, and even more preferably 10 μm or less.

The weight-average particle diameter is determined in the manner described in the examples.

Particles composed of synthetic resin are exemplified by crosslinked acrylic particles, polymethacrylic acid particles, silicone resin particles, and polyethylene particles.

Particles composed of inorganic acid are exemplified by particles composed of silicon oxide, particles composed of calcium carbonate, and particles composed of diatomous earth. Among the particles composed of silicon oxide, silica particles and synthetic silica particles are preferable, with which diatomous earth may be used together.

(Organic Lubricant)

Organic lubricant used in the present invention is preferably fatty acid amide and fatty acid ester.

Examples of the fatty acid amide include oleic amide, erucamide, behenamide, ethylenebis oleic amide, hexamethylenebis oleic amide. They may be used alone, however, combination use of two or more amides is preferable because it leads to maintenance of slipperiness and anti-blocking effect even in a tough environment.

Examples of the fatty acid ester include ethyl oleate, stearyl stearate, tricaprylic acid ester, and tricapric acid ester.

The organic lubricant preferably has a melting point of 25° C. or higher.

(Resin Composition)

A resin composition constituting the seal layer included in the sealant film of the present invention preferably include (a) polyolefin-based resin and (b) silylated polyolefin resin.

A content of (b) silylated polyolefin resin in the resin composition is 2% by weight or more, more preferably 5% by weight or more, even more preferably 7% by weight or more, and particularly preferably 12% by weight or more. A content of silylated polyolefin of 2% by weight or more leads to enough liquid repellent properties, especially repellent properties for dietary oil.

A content of (b) silylated polyolefin resin in the resin composition is 40% by weight or less, more preferably 30% by weight or less, even more preferably 20% by weight or less, and still more preferably 15% by weight or less. If the content of silylated polyolefin resin content is around 40% by weight, further improvement in liquid repellent properties is less likely to be expected. The less the content of the silylated polyolefin resin is, the less the silylated polyolefin is deposited on a surface of the seal layer.

The content of the silylated polyolefin resin is determined in the manner described in the examples.

The resin composition constituting the seal layer included in the sealant film of the present invention preferably include (c) particles composed of inorganic oxide or synthetic resin.

A content of (c) particles composed of inorganic oxide or synthetic resin in the resin composition is preferably 0.1% by weight or more, more preferably 0.3% by weight or more, even more preferably 0.4% by weight or more; and preferably 3.0% by weight or less, more preferably 2.5% by weight or less, and even more preferably 2.0% by weight or less.

(c) particles composed of inorganic oxide or synthetic resin included in the resin composition constituting the seal layer make it easier for the arithmetic average roughness of a surface of the seal layer to be 0.07 μm or more, which, as a result, easily leads to extreme reduction in kinetic friction coefficient between surfaces of the seal layer of the film or between the seal layer and the other surface of the film, and leads to extreme reduction in blocking strength of surfaces of the seal layer of the film.

The reason is considered that (b) silylated polyolefin resin is concentrated at a surface of the seal layer, and by providing predetermined asperity to the film surface having decreased crystallinity and hardness, the influence of the decrease is reduced and the effect of reducing the kinetic friction coefficient ant the blocking strength is improved.

A content of the particles composed of inorganic acid or synthetic resin of 3.0% by weight or less prevents the surface asperity from being too large, and liquid repellent properties are unlikely to deteriorate.

The resin composition constituting the seal layer included in the sealant film of the present invention preferably include (d) fatty acid ester or fatty acid amide.

A content of (d) fatty acid amide and fatty acid ester in the resin composition is preferably 0.01 to 0.5% by weight, more preferably 0.05 to 0.4% by weight, and particularly preferably 0.1 to 0.3% by weight. A content of fatty acid amide of 0.5% by weight or less is unlikely to lead to reduction in seal strength.

(d) fatty acid amide and fatty acid ester included in the resin composition constituting the seal layer make it easier for the kinetic friction coefficient between the surfaces of the seal layer the arithmetic average roughness of which is made 0.07 μm or more, or between the seal layer and the other surface of the film to be further reduced, and make it easier for the blocking strength of surfaces of the seal layer to be further reduced.

(Others)

In the range not diminishing the performance as the sealant film of the present invention, additives such as antioxidant, heat resistant stabilizer, weathering stabilizer, and crystal nucleating agent; ethylene-vinyl acetate copolymer; ethylene-acrylic acid ester copolymer; and the like can be included.

(Process for Producing the Film)

Process for producing the sealant film of the present invention, for example, includes a step of melt kneading polyethylene-based resin composition including the polyethylene-based resin, a step of melt extruding the melt kneaded resin composition to obtain a sheet of the molten resin composition, and a step of cooling and solidifying the sheet of the molten resin composition.

The sealant film of the present invention may be a single-layer film, however, more preferably a multi-layer film. In the case where the film is a multi-layer film, other layer composed of a thermoplastic resin composition, preferably a polyolefin-based resin composition may be formed on the layer including the polyethylene-based resin and the silylated polyolefin at least one surface of which has an arithmetic average roughness of 0.07 μm or more and 0.5 μm or less.

In the case where the film is a single-layer film, the film preferably has a thickness of 3 μm or more, more preferably 10 μm or more, even more preferably 15 μm or more, and particularly preferably 20 μm or more. The thickness is preferably 200 μm or less, more preferably 150 μm or less, and particularly preferably 100 μm or less. A thickness of less than 3 μm decreases the effect of silica particles, and anti-blocking effect and slipperiness becomes difficult to be obtained.

The process will be described at length in the following paragraphs. A longitudinal direction means the direction along which an unstretched sheet is run; a width direction means the direction perpendicular to the longitudinal direction.

(Step of Mixing Raw Materials)

When silylated polyolefin resin and polyethylene-based resin are mixed, or when particles such as silica particles and polyethylene-based resin are mixed, any process is available in which the above materials can be uniformly mixed, and when a masterbatch is used, the process is exemplified by a mixing process using a ribbon blender, a Henschel mixer, and a tumbler mixer.

(Step of Melt Kneading)

First, film raw materials are dried or hot-air dried so that moisture content of the polyethylene-based resin becomes less than 1000 ppm. Next, the respective raw materials are weighed and mixed to be supplied to an extruder, which is melt kneaded.

The lower limit of a temperature of melt kneading of the polyethylene-based resin is preferably 200° C., more preferably 210° C., and even more preferably 220° C. A melt kneading temperature lower than the above may lead to unstable discharge. The upper limit of a melt kneading temperature is preferably 260° C. A melt kneading temperature higher than the above may facilitate decomposition of the resin, which results in more amount of foreign material such as crosslinked organic substance, which is so-called gel, that is generated as a result of recombination of the decomposed resin.

If the aforementioned antioxidant is added to the polyethylene-based resin composition, melt extruding at a higher temperature becomes available, however, the temperature is still preferably 270° C. or lower.

(Filtration)

In the melt kneading step, high precision filtration can be performed to remove foreign material included in the molten polyethylene-based resin composition. A filter medium used for the high precision filtration of the molten resin is not particularly limited, and a filter medium made of a stainless steel sintered body is suitable because of its excellence in performance of removing agglomerates main constituents of which is Si, Ti, Sb, Ge, and Cu derived from additives such as a catalyst. Filtering accuracy of the high precision filtration is preferably 200 μm or less.

(Filtering Pressure Boost)

Smaller amount of pressure boost during melt kneading of the polyethylene-based resin composition is preferable.

(Step of Melt Extruding)

Subsequently, a sheet of the molten polyethylene-based resin composition is melt extruded from, for example, a T-die, and cast on a cooling roll to be cooled and solidified to obtain an unstretched sheet. In particular, casting on a cooling roll is preferable.

The silylated polyolefin used in the present invention does not bleed out even after the melt kneading step and the extruding step, because it is copolymer with polyethylene, and foreign material and die drool, which would otherwise deposit when silicone resin is added, is unlikely to deposit.

The melt extruded sheet of the melt kneaded polyethylene-based resin composition may be made into a film by a process such as a T-die process or an inflation process, and the T-die process is especially desirable in that a melt temperature of the resin is allowed to be higher.

(Lip Contamination (Bleed-Out))

When the silylated polyolefin, the silica particles, and the polyethylene-based resin are melt extruded from a T-die, it is better that a lip aperture of the T-die is less contaminated. Lip contamination is measured in the manner described in the examples.

(Step of Cooling and Solidifying)

For example, the melt extruded sheet of the molten polyethylene-based resin composition from a T-die is preferably cast on a cooling roll to be cooled. The lower limit of a temperature of the cooling roll is preferably 10° C. A temperature lower than the above is not preferable, not only because effect of preventing crystallization peaks out, but also because problems such as condensation occurs. The upper limit of a temperature of the cooling roll is preferably 70° C. A temperature higher than the above is not preferable because it facilitates crystallization to decrease transparency. In addition, when a temperature of the cooling roll is set in the above range, an environmental temperature around the cooling roll is preferably decreased to prevent condensation.

During casting, since high-temperature resin is in contact with a surface of the cooling roll, the temperature of the surface of the cooling roll increases. While the cooling roll is usually cooled with pipes disposed therein in which cooling water flows, temperature difference in the width direction of the surface of the cooling roll is needed to be reduced by securing sufficient amount of cooling water, contriving an arrangement of the pipe, as well as maintaining the pipe to prevent sludge from adhering to the pipe, and the like. The unstretched sheet preferably has a thickness in the range of 3 to 200 μm.

(Multilayer Structure)

The sealant film of the present invention preferably has a multilayer structure. In the case of having a multilayer structure, at least on one side, the sealant film may have a layer that includes the polyolefin-based resin and the silylated polyolefin and that has a surface having an arithmetic average roughness of 0.07 μm or more and 0.5 μm or less, and the sealant film may further have one or two or more other layers composed of a thermoplastic resin composition, preferably a polyolefin-based resin composition.

The multilayer film having the silylated polyolefin only in the surface layer can reduce the used amount of the silylated polyolefin, and also reduce its deposition. Furthermore, it can improve other film properties, and add new functions to the film.

Specific processes for producing a multilayer film may be a process using a generally used multi-layering machine (such as a multi-layer feed block, a static mixer, and a multi-layer multi-manifold).

For example, thermoplastic resins sent from different flow channels of two or more extruders may be multi-layered using a multi-layer feed block, a static mixer, and a multi-manifold die. Alternatively, using only one extruder, the aforementioned multi-layering machine may be introduced in a melt line between the extruder and the T-die.

In the case where the film is two-layered, at least on one side, the film preferably has a layer that includes the polyolefin-based resin and the silylated polyolefin and that has a surface the arithmetic average roughness of which is 0.07 μm or more and 0.5 μm or less as a seal layer (layer A), and the other layer composed of a thermoplastic resin composition, preferably a polyolefin-based resin composition as a laminate layer (layer C).

In the case where the film is three-layered, at least on one side, the film preferably has a layer that includes the polyolefin-based resin and the silylated polyolefin and that has a surface having an arithmetic average roughness of 0.07 μm or more and 0.5 μm or less as a seal layer (layer A), and the other two layers composed of a thermoplastic resin composition, preferably a polyolefin-based resin composition, each of which is an intermediate layer (layer B) and a laminate layer (layer C), respectively. The structure is preferably has a sequence of layer A, layer B, and layer C, and the outermost layers are the layer A and the layer C, respectively.

Polyolefin-based resin used for the intermediate layer (layer B) and the laminate layer (layer C) is preferably polyethylene-based resin and polypropylene-based resin.

(Polyethylene-based Resin)

The polyethylene-based resin used for the intermediate layer (layer B) and the laminate layer (layer C) is any of homopolymer of ethylene monomers, copolymer of ethylene monomers and α-olefins, copolymer of ethylene monomers and other monomers, and a mixture thereof.

The α-olefins are exemplified by propylene, butene-1, hexene-1, 4-methyl pentene-1, octene-1, decene-1, and 3-methyl butene-1.

The other monomers are exemplified by monomers of vinyl acetate, (meth)acrylic acid, and (meth)acrylic acid ester.

The Polyethylene-based resin may be random or block copolymer or a mixture thereof that may be crystalline, or low-crystalline or amorphous.

Copolymer of ethylene monomers and α-olefins is generally referred to as high pressure low density polyethylene, linear low density polyethylene, medium density polyethylene, and high density polyethylene.

Such polyethylene-based resin can lead to excellence in heat seal strength, hot tack performance, contaminant heat sealing performance, and impact resistance, however, the amount of the copolymer of ethylene monomers and other monomers is preferably zero or small.

The polyethylene-based resin used for the intermediate layer (layer B) and the laminate layer (layer C) may be different or may be the same.

In this case, the average density of the polyethylene-based resin in the respective layers of the film is preferably as "the sealant layer (layer A)≤the intermediate layer (layer B)≤the laminate layer (layer C)". Such a configuration is effective to maintain slipperiness of the sealant film after being laminated, because added organic lubricant is less likely to migrate to a layer having higher density.

The lower limit of a density of the intermediate layer (layer B) is preferably 900 kg/m$^3$, more preferably 920 kg/m$^3$, and even more preferably 930 kg/m$^3$. A density less than the above may lead to poor elasticity to decrease processability.

The upper limit of a density of the intermediate layer (layer B) is preferably 960 kg/m$^3$, more preferably 940 kg/m$^3$, and even more preferably 935 kg/m$^3$.

(Polypropylene-Based Resin)

The polypropylene-based resin used for the intermediate layer (layer B) and the laminate layer (layer C) is homopolymer of propylene monomers, random or block copolymer of propylene monomers and α-olefins, or a mixture thereof. The α-olefins are exemplified by ethylene, butene-1, pentene-1, hexene-1, 3-methyl butene-1, 4-methyl pentene-1, octene-1, and decene-1.

The aforementioned organic lubricant may be used for the intermediate layer (layer B) of the film of the present invention, the lower limit of the organic lubricant content is preferably 200 ppm, and more preferably 400 ppm. The lubricant content less than the above may lead to decreased slipperiness.

The upper limit of erucamide content in the intermediate layer is preferably 2000 ppm, and more preferably 1500 ppm. Erucamide content more than the above may lead to excessive slipperiness, and may result in telescoping of the film.

The intermediate layer (layer B) of the present invention may include 10 to 30% by mass of recycled resin.

In the present invention, actinic radiation treatment such as corona treatment is preferably performed to the laminate layer (layer C) of the above exemplified polyethylene-based sealant film, which improve laminate strength.

(Film Properties)

Film properties of the sealant film of the present invention will be specifically described.

(Arithmetic Average Roughness Ra)

A surface of the seal layer of the sealant film of the present invention preferably has an arithmetic average roughness Ra of 0.07 µm or more. An arithmetic average roughness of 0.07 µm or more reduces a kinetic friction coefficient between the layer surfaces or between the layer surface and a film surface opposite to the layer surface, which means that it is likely to reduce a kinetic friction coefficient between surfaces of the seal layer of the film or between the seal layer and the other surface of the film. In addition, it is likely to reduce blocking strength of surfaces of the seal layer of the film. As a result, handleability of the film becomes improved. More preferably, the surface of the seal layer has an arithmetic average roughness of 0.10 µm or more, even more preferably 0.13 µm or more, and still more preferably 0.15 µm or more.

A surface of the seal layer of the sealant film of the present invention preferably has an arithmetic average roughness Ra of 0.3 µm or less. An arithmetic average roughness of 0.3 µm or less prevents a kinetic friction coefficient between the layer surfaces or between the layer surface and a film surface opposite to the layer surface from becoming too small, and thus, the film is less likely to telescope to improve handleability of the film. More preferably the surface has an arithmetic average roughness of 0.25 µm or less.

The arithmetic average roughness is measured in the manner described in the examples.

(Maximum Peak Height Rz)

A surface of the seal layer of the sealant film of the present invention preferably has a maximum peak height Rz of 10 µm or more. A maximum peak height of 10 µm or more reduces an area of contact between the layer surfaces or between the layer surface and a film surface opposite to the layer surface, and thus, anti-blocking effect is largely improved to enhance handleability of the film. More preferably the surface of the seal layer has a maximum peak height Rz of 13 µm or more, and even more preferably 15 µm or more.

A surface of the seal layer of the sealant film of the present invention preferably has a maximum peak height Rz of 30 µm or less. A maximum peak height of 30 µm or less prevents a volume of the gap between the layer surfaces or between the layer surface and a film surface opposite to the layer surface from becoming too large, and thus, the film is less likely to telescope and handleability of the film is improved. More preferably the surface has a maximum peak height of 25 µm or less.

The maximum peak height is measured in the manner described in the examples.

(Abundance ratio (Si/C) of silicon atoms Si to carbon atoms C included in the seal layer (average Si concentration))

An abundance ratio (Si/C) of silicon atoms Si to carbon atoms C included in the seal layer of the sealant film of the present invention is preferably 0.001 or more. The average Si concentration of 0.001 or more leads to improvement in liquid repellent properties for contents that shows viscosity such as dietary oil, tonkatsu sauce, and soy sauce. More preferably the average abundance ratio is 0.005 or more, even more preferably 0.007 or more, preferably 0.01 or more, and particularly preferably 0.012 or more.

An abundance ratio (Si/C) of silicon atoms Si to carbon atoms C included in the seal layer of the sealant film of the present invention is preferably 0.02 or less. With an abundance ratio of 0.02 or less, heat seal strength is less likely to be reduced. More preferably the abundance ratio is 0.018 or less, and even more preferably 0.016 or less.

The abundance ratio is determined in the manner described in the examples.

(An abundance ratio (Si/C) of silicon atoms Si to carbon atoms C present at a surface of the seal layer (surface Si concentration))

An abundance ratio (Si/C) of silicon atoms Si to carbon atoms C present at a surface of the seal layer of the sealant film of the present invention is preferably 0.05 or more. The surface Si concentration of 0.05 or more leads to improved liquid repellent properties for contents that shows viscosity such as dietary oil, tonkatsu sauce, and soy sauce; and especially it has a profound effect on improvement in liquid repellent properties for dietary oil. More preferably the surface Si concentration is 0.07 or more, even more preferably 0.1 or more, preferably 0.13 or more, and particularly preferably 0.15 or more.

An abundance ratio (Si/C) of silicon atoms Si to carbon atoms C present at a surface of the seal layer of the sealant film of the present invention is preferably 0.3 or less. With the surface Si concentration of 0.3 or less, heat seal strength is likely to be reduced.

The surface Si concentration is determined in the manner described in the examples (Ratio of the Surface Si Concentration to the Average Si Concentration)

A ratio of the abundance ratio (Si/C) of silicon atoms Si to carbon atoms C present at a surface of the seal layer to the abundance ratio (Si/C) of silicon atoms Si to carbon atoms C included in the seal layer of the sealant film of the present invention is preferably 2 or greater, more preferably 5 or greater, even more preferably 8 or greater, and particularly preferably 10 or greater.

The ratio is determined in the manner described in the examples.

(Heat Seal Strength)

The sealant film of the present invention preferably has heat seal strength of 35 N/15 mm or more, preferably 40 N/15 mm or more, and more preferably 45 N/15 mm or more.

The heat seal strength is determined in the manner described in the examples.

(Liquid Repellent Properties)

An indicator of liquid repellent properties of the sealant film of the present invention is residual volume of adhering contents showing viscosity such as dietary oil, tonkatsu sauce, and soy sauce. The residual volume of adhering contents for at least 2 kinds of contents is preferably 0.08 mg/28 $cm^2$ or less, and the residual volume of adhering contents for at least one kind of contents is preferably 0.6 mg/28 $cm^2$ or less.

The residual volume is determined in the manner described in the examples.

(Existence Condition of Silylated Polyolefin Resin)

In the seal layer of the sealant film of the present invention, the silylated polyolefin is preferably concentrated at a surface of the film. However, preferable state of the silylated polyolefin is that the silylated polyolefin that is separated does not deposit on the surface of the seal layer.

Furthermore, the silylated polyolefin is preferably finely dispersed in the seal layer of the sealant film of the present invention, and preferably have a micro phase separation structure.

The existence condition of the silylated polyolefin resin or silicone resin on the surface of the seal layer can be observed with a scanning electron microscope, and qualitative analysis of Si element and C element is also available with energy dispersive X-ray.

In addition, a cross-section of the seal layer can be observed with a transmission electron microscope.

Observation is performed in the manner described in the examples.

(Kinetic Friction Coefficient)

The upper limit of a kinetic friction coefficient between the layer surfaces of the seal layer of the sealant film of the present invention is preferably 2.0, more preferably 1.5, even more preferably 1.0, still more preferably 0.7, particularly preferably 0.5, and most preferably 0.4. With a kinetic friction coefficient between the layer surfaces of the seal layer of 2.0 or less, a mouth of a bag made of the film can be easily opened, and loss generated during processing is likely to be reduced.

The lower limit of a kinetic friction coefficient between the layer surfaces of the seal layer of the sealant film of the present invention is preferably 0.05, more preferably 0.08, and even more preferably 0.1. With a kinetic friction coefficient between the layer surfaces of the seal layer of 0.05 or more, the film can be easily heat sealed to produce a bag, and loss generated during processing is likely to be reduced.

The upper limit of a kinetic friction coefficient between the layer surface of the seal layer of the sealant film of the present invention and a film surface opposite to the layer surface is preferably 3.5, more preferably 2.0, even more preferably 1.2, still more preferably 1.0, particularly preferably 0.8, and most preferably 0.7. With a kinetic friction coefficient between the layer surface of the seal layer and a film surface opposite to the layer surface of 3.5 or less, wrinkles are less likely to be produced when the film is wound, and loss generated during processing is likely to be reduced.

The lower limit of a kinetic friction coefficient between the layer surface of the seal layer of the sealant film of the present invention and a film surface opposite to the layer surface is preferably 0.05, more preferably 0.08, and more preferably 0.1. With a kinetic friction coefficient between the layer surface of the seal layer and a film surface opposite to the layer surface of 0.05 or more, the film is less likely to become too slippery, and less likely to telescope.

The kinetic friction coefficient is determined in the manner described in the examples.

(Blocking Value)

The upper limit of a blocking value between the layer surfaces of the seal layer of the sealant film of the present invention is preferably 500 mN/20 mm, more preferably 200 mN/20 mm, even more preferably 150 mN/20 mm, particularly preferably 70 mN/20 mm, and most preferably 60 mN/20 mm. With a blocking value between the layer surfaces of the seal layer of 500 mN/20 mm or less, the film can be smoothly wound out from a film roll for processing.

The lower limit of a blocking value between the layer surfaces of the seal layer of the sealant film of the present invention is preferably 0 mN/20 mm, however, a blocking value of 15 mN/25 mm is practically sufficient.

The blocking value is determined in the manner described in the examples.

(Haze)

The upper limit of a haze of the sealant film of the present invention is preferably 15%, more preferably 10%, and even more preferably 6%. With a haze of 15% or less, contents is easily discerned.

The lower limit of a haze of the sealant film of the present invention is preferably 0%, however, a haze of 2% is practically sufficient.

The haze is determined in the manner described in the examples.

(Young's Modulus/in the Longitudinal Direction)

The lower limit of a Young's modulus (in the longitudinal direction) of the sealant film of the present invention is preferably 100 MPa, more preferably 120 MPa, even more preferably 150 MPa, and particularly preferably 165 MPa. A Young's modulus of 100 MPa or more can prevent the film from having too poor elasticity, and the film can be easily processed.

The upper limit of a Young's modulus (in the longitudinal direction) of the sealant film of the present invention is preferably 400 MPa, more preferably 300 MPa, and even more preferably 250 MPa.

(Young's Modulus/in the Width Direction)

The lower limit of a Young's modulus (in the width direction) of the sealant film of the present invention is preferably 100 MPa, more preferably 120 MPa, even more preferably 150 MPa, and particularly preferably 170 MPa. A young's modulus of 100 MPa or more can prevent the film from having too poor elasticity, and the film can be easily processed.

The upper limit of a Young's modulus (in the width direction) of the sealant film of the present invention is preferably 400 MPa, more preferably 300 MPa, and even more preferably 250 MPa.

(Laminate)

In general, the sealant film of the present invention is laminated with at least one more base film to form a laminate, and the laminate is used as a packaging film or a packaging sheet.

The base film is not particularly limited, and may be a polyolefin film such as polyethylene and polypropylene; a film of styrene-based resin; a film of polyester such as polyethylene terephthalate and polybutylene terephthalate; a film of polyamide such as nylon 6 and nylon 6,6; or a stretched film thereof; or a laminate with a polyolefin film and a resin film having gas barrier effect such as a polyamide film or a film of ethylene-vinyl alcohol copolymer; metallic foil such as aluminum; a vapor deposition film made by evaporating aluminum or silica thereon; or paper, which is appropriately selected depending on the purpose. The base film may be made of one kind, or may be a laminate of a combination of two kinds or more.

The base film being next to the sealant layer preferably does not contain the silylated polyolefin. In addition, the base film being next to the sealant layer is preferably a polyolefin film.

A process for laminating the sealant film on the base film may be a process of dry laminating the base film and the sealant film, and a process of extrusion lamination in which only a resin for the sealant layer is extruded and laminated on the base film. Of these, the dry lamination is preferable from the viewpoint of productivity.

In order to adhere the sealant film of the present invention more strongly to the base film, the laminate may preferably have the structure of the sealant film/an adhesion layer/the base film. The adhesion layer may be anchor coating agent such as urethane-based or isocyanate-based adhesive agent, or may be adhesive resin of modified polyolefin such as unsaturated carboxylic acid-grafted polyolefin to strongly adhere the adjoining layer to the sealant layer.

The thickness of the laminate is not particularly limited, however, when the laminate is used as a film for a cover and the like, the thickness is preferably 10 to 200 μm, and when the laminate is used as a sheet for a cup or a tray, the thickness is preferably 200 to 1000 μm.

(Package)

A package can be produced by placing two surfaces of the sealant film of the aforementioned laminate such that the surfaces are face-to-face, or placing the surface of the sealant film and the base film of the laminate such that they are face-to-face, and subsequently heat sealing from the outer side of the film at least one part of the periphery of the placed film such that a package having desired shape can be obtained. In addition, heat sealing the entire periphery of the placed film can produce a package that is tightly sealed. Combining the producing process of a package with a process of filling contents, heat sealing the bottom and the sides of a pouched package and then filling contents followed by heat sealing the upper side can produce a package. Accordingly, the laminate can be used with an automatic packaging machine for packaging of solid materials such as snack foods, powder materials, and liquid materials.

Alternatively, filling contents in a container formed into a cup shape by vacuum forming or compressed-air forming; a container obtained by injection forming or blow forming; or a container made of paper base material, and covering the container with the laminate of the present invention as a lid and heat sealing them to obtain the container in which the contents are packaged.

EXAMPLES

Hereinafter, embodiments of the present invention will be specifically described with reference to examples and comparative examples, however, the present invention is not restricted by the following examples.

Measurement values of each item in the present description, the examples, and the comparative examples were determined in the following manner.

(Properties of Raw Materials)

A density, a melt flow rate (MFR), a melting point of polyolefin-based resin and silylated polyolefin used for producing a sealant film; and a weight-average particle diameter and a content ratio of inorganic particles or particles made of synthetic resin were determined in the following manner.

Note that these measurement values may be obtained: when the sealant film was a single layer film, the whole film was used as a sample; when the sealant film was a laminate, only the layer to be measured was peeled to be used as a sample after identifying a boundary of the layer with an electron microscope. And then, the sample was dissolved in a solvent in which only a target material was insoluble, the solution was filtered to obtain a residue, and the residue was measured to obtain the measurement values. In the case where the layer to be measured was peeled from a laminate, the process could be easily performed by laminating the sealant film on a polyethylene terephthalate (PET) film and the like, and then peeling the layer with a razor.

(Density: $kg/cm^3$)

A density was determined by density-gradient tube method in accordance with JIS-K7112.

(Melt Flow Rate (MFR): g/10 min.)

A Melt flow rate (MFR) was determined at 190° C. in accordance with JIS-K7210.

(Melting Point: ° C.)

A melting point was determined with a differential scanning calorimeter (DSC) manufactured by Seiko Instruments Inc., using a sample of 10 mg at a ramp rate of 10° C./min.

A temperature of a detected melt endothermic peak was determined to be a melting point.

(Content of Particles Made of Inorganic Oxide or Synthetic Resin in the Film: % by Weight)

A content of particles made of inorganic oxide or synthetic resin in the film was calculated based on their added content in a raw resin composition before processing.

Note that even after being formed as a film, a particle content can be measured by a process in which the film is dissolved in decane at a temperature at which the film can be completely dissolved, and the process may include filtering the solvent with a filter having filtering accuracy of 2 μm to separate silica particles.

(Weight-Average Particle Diameter of Particles Made of Inorganic Oxide or Synthetic Resin: μm)

A weight-average particle diameter of particles made of inorganic oxide or synthetic resin can be determined as a particle diameter of a cumulative 50% by mass from smaller particle diameter of a particle size distribution curve obtained with, for example, a laser diffraction scattering particle size analyzer "MT3200II" manufactured by Nikkiso Co., Ltd.

Likelihood of compound deposition from a resin composition constituting the seal layer of the obtained sealant film was measured in the following manner.

(Likelihood of Compound Deposition from a Resin Composition Constituting the Seal Layer)

A resin composition used for the seal layer of comparative example 1 was extruded at 230° C. from a plurality of nozzles having a diameter of 4 mm disposed in the width direction of a die of an extruder, and deposition level (pollution level) of the compound around the nozzles was visually observed after one hour from the onset of the extrusion to classify the level into Good or Bad depending on the following standard.

Good: Compound deposition could not be observed around the nozzles.

Bad: Compound deposition could be obviously observed around the nozzles.

(Properties of the Sealant Film)

Properties of the obtained sealant film was determined in the following manner.

(Abundance Ratio of Silicon Atoms Si to Carbon Atoms C Present at a Surface of the Seal Layer)

A surface of the seal layer of the sealant film was wiped with ethanol before being measured. The surface of the seal layer was excited with an instrument for electron spectroscopy for chemical analysis (K-Alpha manufactured by Thermo Fisher Scientific) where excited X-ray: monochromated ALKα radiation; X-ray output: 12 kV, 6 mA; photoelectron escape angle: 90° ; spot size: 400 μmφ; pass energy: 50 eV (narrow scan); step: 0.1 eV (narrow scan), and a surface abundance ratio of the detected elements was calculated.

Note that the surface abundance ratio of the detected elements was an abundance ratio in the region the depth of which was about several nanometers to 10 nm from the film surface.

(Abundance Ratio of Silicon Atoms Si to Carbon Atoms C Included in the Seal Layer)

1) Roughly recognizing the layer structure by observing the cross section previously, only a resin composition constituting the seal layer was peeled off with a feather razor. The peeled sample was completely dissolved in a mixed solvent of o-dichlorobenzene/deuterated benzene having a volume ratio of 80/20 at 135° C. The concentration of the sample was about 25 to 30 mg/0.7 mL. On the occasion of one-dimensional Si-NMR measurement, about 1 wt % of acetylacetone chromium(III) with respect to the solution to be measured was added.

Using this sample, the following measurement was performed to identify a chemical formula, molecular weight, and content ratio of silylated polyolefin resin included in the resin composition constituting the seal layer.

2) First, in reference to Aldrich standard spectrum, standard samples and the like, the structure of the compound was roughly identified by examining the way how elements H, C, and Si combined, using $^1$H-NMR spectrum, $^{13}$C-NMR spectrum, $^{13}$C-DEPT spectrum, and $^{29}$Si-NMR spectrum, which are one-dimensional NMR.

The measurement conditions were as follows:

Instrument: Fourier transform nuclear magnetic resonance spectrometer (AVANCE NEO 600 manufactured by Bruker Japan Co., Ltd.)

Resonant frequency: $^1$H-NMR: 600.13 MHz, $^{13}$C-NMR: 150.92 MHz, $^{29}$Si-NMR: 119.22 MHz Measurement temperature: $^1$H-NMR: 110 or 115° C., $^{13}$C-NMR: 110 or 115° C., $^{13}$C-DEPT: 110 or 115° C., $^{29}$Si-NMR: 110° C.

Pulse repetition time: $^1$H-NMR: 3.75 sec., $^{13}$C-NMR: 2.8 to 2.9 sec., $^{13}$C-DEPT: 3.5 sec., $^{29}$Si-NMR: 7.0 sec.

Detection pulse angle: $^1$H-NMR: 30°, $^{13}$C-NMR: 30°, $^{29}$Si-NMR: 90°

Way of decoupling $^1$H: $^{13}$C-NMR: full decoupling, $^{29}$Si-NMR: inverse gated decoupling (FID acquisition time: 0.7 sec.)

Scans: $^1$H-NMR: 16 times, $^{13}$C-NMR: about 300 to 1200 times, $^{13}$C-DEPT: about 100 to 1100, $^{29}$Si-NMR: about 4000 times 3) Furthermore, the structure of combination that had become identified with the one-dimensional NMR was identified in more detail by examining correlated peaks between adjacent $^1$H, correlated peaks between $^1$H in a row, such as adjacent $^1$H, and adjacent $^1$H, correlated peaks of $^1$H and $^{13}$C that directly combined, correlated peaks of heteronuclear ($^1$H, $^{13}$C) between which two bonds or three bonds existed, and correlated peaks of heteronuclear ($^1$H, $^{29}$Si) between which two bonds or three bonds existed, using COSY, TOCSY, $^{13}$C-HSQC, HMBC, $^{29}$Si-HMBC, which are two-dimensional NMR.

4) An abundance ratio of silicon atoms per one carbon atom (Si/C (the average Si concentration)) in the resin composition constituting the seal layer of the sealant film can be determined by molecular formula and molecular weight of silylated polyolefin resin included in the resin composition, and content ratio of the silylated polyolefin in the resin composition constituting the seal layer.

The following is a specific example of determining the abundance ratio in the case where the resin composition constituting the seal layer is a mixture of a copolymer consisting of only constituent units derived from ethylene having vinyl group at the terminal of the main chain, a silylated polyolefin resin the feedstock compound of which is dimethylsiloxane, and a polyethylene resin. Given that the concentration of dimethylsiloxane in the silylated polyolefin is 26% by weight from the calculation of the concentration based on the molecular formula of the silylated polyolefin resin, the average concentration of polydimethylsiloxane in a composition obtained by adding 10 parts by weight of the silylated polyolefin to 90 parts by weight of the polyethylene resin is obtained as 2.6% by weight.

Since the molecular formula of dimethylsiloxane per one unit is $C_2H_6SiO$ (unit molecular weight: 74.15); the molecular formula of the silylated polyolefin resin per one polyolefin unit is $C_2H_4$ (unit molecular weight: 28.05); and the molecular formula of the polyethylene resin per one polyethylene unit is $C_2H_4$ (unit molecular weight: 28.05), per 1 kg of the resin composition, the amount of dimethylsiloxane is (1000×2.6/100)/74.15=0.35 mol; the amount of polyolefin of the silylated polyolefin is (1000×(10−2.6)/100)/28.05=2.6 mol; and the amount of the polyethylene resin is (1000×90/100)/28.05=32.1 mol.

Accordingly, per 1 kg of the resin composition, Si (silicon) is 0.35 mol, C (carbon) is 0.35×2+2.6×2+32.1×2=70.1 mol, and the abundance ratio of silicon atoms per one carbon atom in the resin composition (Si/C) is calculated to be 0.35/70.1=0.005.

(Arithmetic Average Roughness Ra: μm)

An arithmetic average roughness Ra of an arbitrary area of 1 mm×0.2 mm on the surface of the seal layer of the sealant film having a square shape of 3 cm×3 cm was determined with a contact-type surface roughness tester (model: ET4000A manufactured by Kosaka Laboratory Ltd.) in accordance with JIS B0601-2001. The measurement was performed three times at different areas and the average was obtained to determine the arithmetic average roughness.

(Maximum Peak Height Rz: μm)

A maximum peak height Rz of an arbitrary area of 1 mm×0.2 mm on the surface of the seal layer of the sealant film having a square shape of 3 cm×3 cm was determined with a contact-type surface roughness tester (model: ET4000A manufactured by Kosaka laboratory Ltd.) in accordance with JIS B0601-2001. The measurement was performed three times at different areas and the average was obtained to determine the maximum peak height.

(Heat Seal Strength: N/15 mm)

Adhesive for dry lamination manufactured by Toyo-Morton Co., Ltd. (TM569, CAT-10L) was applied to a corona surface of a nylon film (biaxially-stretched nylon film manufacture Toyobo Co., Ltd.: N1100, 15 μm) such that the amount of solid content of the adhesive was 3 g/m$^2$, and solvent was volatilized and removed with an oven the temperature of which was 80° C., and subsequently, a corona surface of the sealant film and the surface of the nylon film to which the adhesive had been applied were nipped on a temperature control roll the temperature of which was 60° C. to be laminated. The laminated film was aged for two days at 40° C. to obtain a laminate.

The laminate films were heat sealed under the conditions where each film was placed such that each of the longitudinal direction of the films was in the same direction, and the sealant films were face-to-face, a seal width was 10 mm, seal pressure was 0.1 MPa, seal duration was 0.5 sec., and seal temperatures were at intervals of 10° C. in the range from 120 to 220 ° C.

The heat sealed laminate was placed parallel to the longitudinal direction to obtain a test sample having a width of 15 mm.

The test sample was set to an autograph (model: UA-3122 manufactured by Shimadzu corporation), and the seal surface was peeled at a rate of 200 mm/min., and the maximum value was measured. Three test samples were measured at each seal temperature, and each average was determined to be the seal strength. The heat seal strength was the largest among the average values.

(Liquid Repellent Properties)

Liquid repellent properties of the obtained sealant film were evaluated in the following manner.

(1) A tubular reed-shaped sample of 10 cm×2.5 cm was produced by cutting out from the sealant film such that the cut piece had a length of 10 cm and a width of 5 cm, applying pieces of double-stick tape (NW-5, 5 mm width) to both an end of the longitudinal direction side and the adjoining end of the width direction end of the laminate layer surface of the cut piece, folding the cut piece such that the seal layer was outside at the center of the width direction, and sticking the double-stick tape to the other laminate layer surface.

(2) The tubular reed-shaped sample produced in the process (1) was weighed.

(3-1) The evaluation liquid shown below was put in a disposal cup of 100 ml such that the volume of each liquid was about 70% of the cup. The weighed tubular reed-shaped sample was sunk into the evaluation liquid such that the lower portion of 5 cm from the bottom of the sample was soaked in the liquid for one second. In this process of soaking, a support such as a metal ruler may be inserted through an opening of the tubular reed-shaped sample to improve handleability, which can prevent the opening of the sample from being mistakenly soaked in the evaluation liquid.

Evaluation liquid: dietary oil (trade name: Nisshin salad oil, manufactured by Nisshin OilliO Group Ltd.), tonkatsu sauce (trade name: Noko sauce, manufactured by Kagome Co., Ltd.), soy sauce (trade name: Koikuchi soy sauce (hon-jozo), manufactured by Kikkoman Corporation).

(3-2) While the evaluation liquid adhered to the tubular reed-shaped sample, the tubular reed-shaped sample was hung for 10 seconds under the condition where the longitudinal direction of the tubular reed-shaped sample was vertical, and subsequently, the sample was hung for 50 seconds under the condition where the sample was tilted such that the width direction was horizontal and the longitudinal direction had an angle of 45° to the width direction.

(4) The tubular reed-shaped sample to which the evaluation liquid adhered was weighed immediately after the process (3-2), which was compared with the weight obtained in the process (2) to obtain a difference, and a residual volume of adhering liquid was determined from the difference. The area of the lower portion of 5 cm from the bottom of the tubular reed-shaped sample was 25 cm$^2$.

(Observation of Dispersion State of Silylated Polyolefin)

While the seal layer surface of the obtained sealant film was observed with a scanning electron microscope, energy dispersive X-ray was radiated on the surface to perform qualitative element analysis and mapping. In addition, the cross-section was observed with a transmission electron microscope. Detailed observation process was as follows.

(Low-vacuum scanning electron microscope (LV-SEM))

A sample of 1 cm×1 cm was cut out from the obtained sealant film, which was put on a sample stage to which carbon tape was stuck, and the sample was coated with 2 nm of platinum-palladium using a magnetron sputtering system to secure electrical conductivity, and then observed in a high-vacuum mode. The surface was observed and photographed using a scanning electron microscope S-3400N manufactured by Hitachi Ltd. at an acceleration voltage of 8 kV.

(Energy Dispersive X-Ray (EDX) Qualitative Element Analysis)

A sample of 1 cm×1 cm was cut out from the obtained sealant film, which was put on a sample stage to which carbon tape was stuck, and the sample was coated with 2 nm of platinum-palladium using a magnetron sputtering system to secure electrical conductivity, and then observed in a high-vacuum mode.

The analysis was performed by radiating X-ray at an acceleration voltage of 8 kV using a scanning electron microscope S-3400N manufactured by Hitachi Ltd. and an energy dispersive X-ray detector XFlash5010 manufactured by Bruker.

The qualitative element analysis was performed based on X-ray spectra of the whole observation field of the sample of the sealant film, and among detected elements, carbon C was mapped in red, and silicon Si was mapped in green.

(Transmission Electron Microscope (TEM) Observation)

On both sides of a sample of 1 cm×1 cm of the obtained sealant film, osmium was vapor deposited, and the sample was embedded in epoxy resin after a process of antistripping from the epoxy resin was performed.

The embedded sample was sliced in a direction perpendicular to the film surface in a frozen condition using a cryomicrotome that was set at −130° C. to obtain an ultrathin slice.

The cross-section was dyed for 30 minutes in ruthenium tetroxide vapor, carbon was vapor deposited on it, and the cross-section was observed and photographed using a transmission electron microscope JEM2100 manufactured by JEOL Ltd. at an acceleration voltage of 200 kV.

(Kinetic Friction Coefficient)

A kinetic friction coefficient between each polyethylene resin film surfaces of the sealant film was measured in accordance with HS-K-7125 except the following conditions.

Environmental condition: 23° C., 65% RH

Measurement equipment: TENSILON STM-T-50BP manufactured by Toyo Baldwin

Measurement condition:

Size of fixed specimen: 297 mm (in the longitudinal direction)×105 mm (in the width direction)

Size of mobile specimen: 70 mm (in the longitudinal direction)×50 mm (in the width direction)

Mass of load weight: 1.5 kg

Crosshead speed: 20 mm/min.

Length of move: 100 mm or more

Calculation method: Calculated from the following equation using the average tested value in the stroke range of 10 mm to 50 mm and the mass of the load weight Kinetic friction coefficient=the average tested value in the stroke range of 10 mm to 40 mm/mass of load weight (Blocking Value)

A blocking value was measured in accordance with ASTM D1893-67 except measuring a blocking value of the sealant layer surfaces of the sealant film under the following conditions.

A sample (10 cm in the width direction, 15 cm in the longitudinal direction) obtained by placing the surfaces to be measured face-to-face was placed on a heat press (model: SA-303 manufactured by Tester Sangyo Co., Ltd.) such that an end of an aluminum plate (2 mm thick) having a size of 7 cm×7 cm was located at a position that was 1 cm inward from the end of the sample in the longitudinal direction (15 cm) at the center of the sample in the width direction (10 cm), and was pressure treated for 15 minutes at 50° C. under a pressure of 440 kgf/cm$^2$.

The sample that had been blocked by the pressure treatment and a bar (diameter of 6 mm, material: aluminum) were loaded on an autograph (model: UA-3122 manufactured by Shimadzu corporation), and force was measured when the blocking part was peeled by the bar at a rate of 100 m/min.

In this case, the measurement was based on the condition where the bar and the peeled surface were horizontal. The measurement was performed for the same sample four times, and the average of the four measurements was obtained to determine the blocking value.

(Haze)

A haze of the obtained sealant film alone was measured with a direct-reading haze meter manufactured by Toyo Seiki in accordance with JIS-K-7105.

Haze (%)=Td (diffuse transmittance %)/Tt (total light transmittance %)×100

(Young's modulus, tensile strength at break, tensile elongation at break)

A Young's modulus in the longitudinal direction and the width direction of the obtained sealant film was measured at 23° C. in accordance with JISK7127.

A sample of 15 mm×200 mm cut out from the film was set to a tensile tester (dual column table-top tester Instron 5965 manufactured by Instron Japan Company Ltd.) with a chuck width of 100 mm. The tensile test was performed at a tensile rate of 200 mm/min.

From a slope of the straight-line portion in early elongation of the obtained stress-strain curve, a Young's modulus was determined.

Tensile strength at break and tensile elongation at break were determined to be strength and elongation respectively at a time when the sample was broken.

The following raw materials were used in the examples and the comparative examples.

(Polyethylene-Based Resin)

(1) 1020L (Ziegler-Natta-based linear low density polyethylene manufactured by Prime Polymer Co., Ltd., density: 909 kg/m$^3$, MFR: 2.0 g/10min., melting point: 115° C.)

(2) FV405 (metallocene-based linear low density polyethylene manufactured by Sumitomo Chemical Co., Ltd., density: 923 kg/m$^3$, MFR: 3.8 g/10 min., melting point: 118° C.)

(3) FV407 (metallocene-based linear low density polyethylene manufactured by Sumitomo Chemical Co., Ltd., density: 930 kg/m$^3$, MFR: 3.2 g/10 min., melting point: 124° C.)

(Silylated Polyolefin Resin)

Exfola LL1513 (manufactured by Mitsui Fine Chemical Inc., including 30% by weight of silylated polyolefin (olefin-silicone copolymer), including 70% by weight of metallocene-based linear low density polyethylene, density: 921 kg/m$^3$, MFR: 30 g/10min., melting point: 121° C.)

(Silicone Resin)

(1) G-501 (grease-oil compound lubricant for plastic, manufactured by Shin-Etsu Chemical Co., Ltd., density: 920 kg/m$^3$)

(Particles of Inorganic Oxide)

(1) KMP-130-10 (spherical silica particles, manufactured by Shin-Etsu Silicone, weight average particle diameter: 10 μm)

(2) Dicalite WF (diatomous earth, manufactured by Grefco. Inc., used after being processed to have a weight average particle diameter of 5 μm with a pin mill)

(Organic Lubricant)

(1) EMB11 (including 2% by weight of ethylenebisoleamide, including FV405 (metallocene-based linear low density polyethylene), manufactured by Sumitomo Chemical Co., Ltd.)

(2) XA1029 (including 0.9% by weight of erucamide, including FV405 (metallocene-based linear low density polyethylene), manufactured by Sumitomo Chemical Co., Ltd.)

Examples 1 to 7

Linear low density polyethylene resin (Sumikathene (R) E, FV405 manufactured by Sumitomo Chemical Co., Ltd. or 1020L manufactured by Prime Polymer Co., Ltd.), a mixture of linear low density polyethylene resin and triblock polymer of polyethylene and silicone represented by the following chemical formula as silylated polyolefin (trade name: Exfola LL1513 manufactured by Mitsui Chemical Inc., content ratio of triblock polymer of polyethylene and silicone: 30% by weight), silica particles having a weight average particle diameter of 10 μm, diatomous earth having a weight average particle diameter of 10 μm, ethylenebisoleamide, and erucamide were melt mixed in a biaxial extruder in such a way that each content had the content ratio (% by weight) shown in Table 1 to produce a sealant layer.

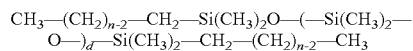

$$CH_3-(CH_2)_{n\text{-}2}-CH_2-Si(CH_3)_2O-(-Si(CH_3)_2-O-)_d-Si(CH_3)_2-CH_2-(CH_2)_{n\text{-}2}-CH_3$$

(In the formula, d is 23, and n is 200.)

In addition, linear low density polyethylene resin (Sumikathene (R) E, FV405 manufactured by Sumitomo Chemical Co., Ltd.) and erucamide were melt mixed in a biaxial extruder in such a way that each content had the ratio (% by weight) shown in Table 1 to produce an intermediate layer.

Furthermore, linear low density polyethylene resin (Sumikathene (R) E, FV407 manufactured by Sumitomo Chemical Co., Ltd.) was melt mixed in a biaxial extruder in such a way that each content had the ratio (% by weight) shown in Table 1 to produce a laminate layer.

Using a multi-layered film forming apparatus, the resin composition of the sealant layer, the resin composition of the intermediate layer, and the resin composition of the laminate layer, which had been melted, were coextruded with a T-die to produce a multi-layered molten sheet, which was placed on a cooling roll to be cooled and solidified, and an unstretched sheet was obtained.

After performing a corona discharge treatment on the laminate layer surface of the obtained sheet, the sheet was wound into a roll-shape at a rate of 20 m/min. to obtain a sealant film having a thickness of 40 μm, and surface wetting tension of the laminate layer of 45 N/m. Detailed conditions were as follows:

Diameter of the extruder for the sealant layer: 60 mm

Diameter of the extruder for the intermediate layer: 90 mm

Diameter of the extruder for the laminate layer: 45 mm

Temperature of melt mixing the raw materials of the sealant layer, the intermediate layer, and the laminate layer: 250° C.

Width of the T-die: 1600 mm

Haul-off speed of the multi-layered molten sheet: 20 m/min.

Temperature of the cooling roll: 40° C.

Thickness of the sealant layer of the sealant film: 8 μm

Thickness of the intermediate layer of the sealant film: 28 μm

Thickness of the laminate layer of the sealant film: 4 μm

Note that the longitudinal direction means the direction along which the unstretched sheet was run; the width direction means the direction perpendicular to the longitudinal direction.

The sealant film obtained in the Examples 1 to 6 were superior in liquid repellent properties and heat seal properties, small in kinetic friction coefficient and blocking value, and exhibited remarkably stable slipperiness and anti-blocking effect. In addition, they had a low haze, and was superior in appearance.

Furthermore, the resin composition used for the seal layer led to less compound deposition, and the sealant film obtained in the Examples 1 to 6 were superior in film processability. The reason is that since the silylated polyolefin used for the seal layer had dimethylsiloxane component, it had small surface energy, and therefore, the silylated polyolefin concentrated at the surface of the seal layer.

FIG. 1, which shows the average Si concentration and the surface Si concentration of the films of Comparative Example 1 and the Examples 1 to 5, shows that the measured values of the surface Si concentration were about 61 times higher at most than the calculated values of the average Si concentration, which means that the silylated polyolefin concentrated at the surface.

The sealant film obtained in the Example 7 was superior in liquid repellent properties and heat seal properties. While it was rather inferior in kinetic friction coefficient and blocking value to the Examples 1 to 6, it exhibited stable slipperiness and anti-blocking effect. In addition, it had a low haze, and was superior in appearance.

Figure 3:
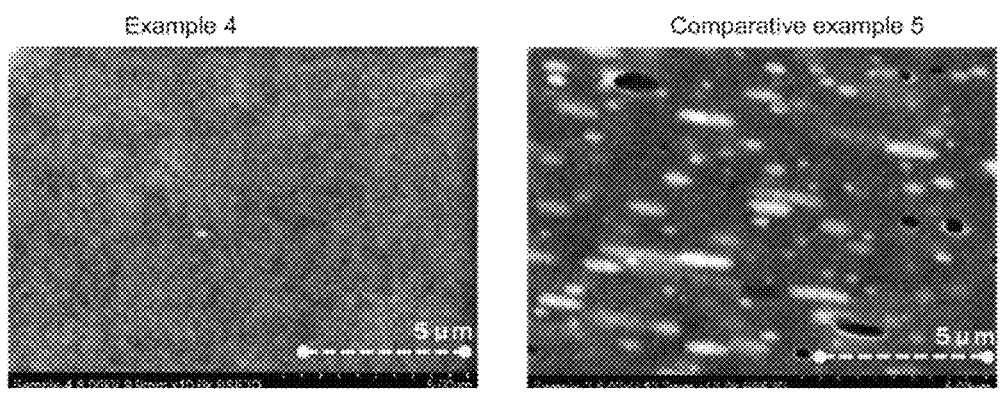
FIG. 3 shows SEM micrographs of a film surface.
Figure 4:
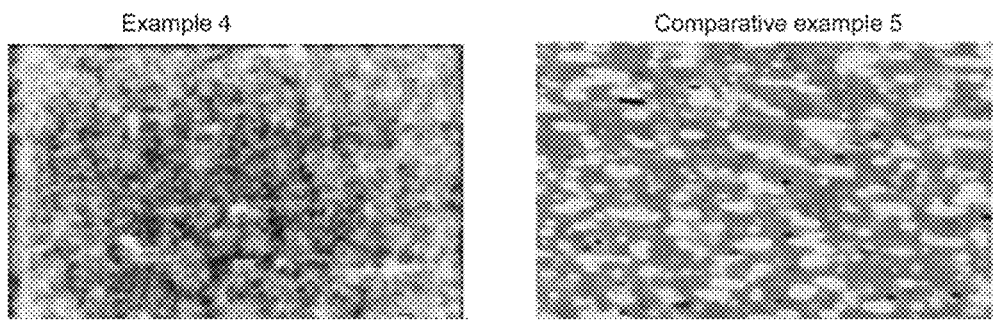
FIG. 4 shows EDX mapping photographs of a film surface.
Figure 5:
FIG. 5 shows TEM micrographs of a film cross-section.
Figure 5:
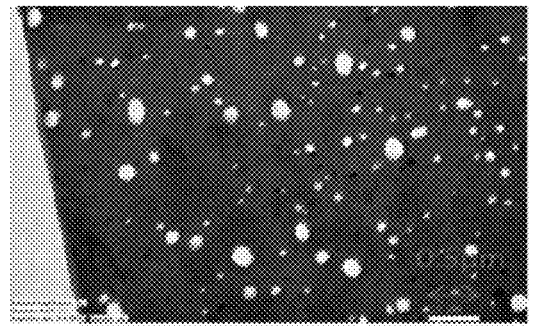
Figure 5:
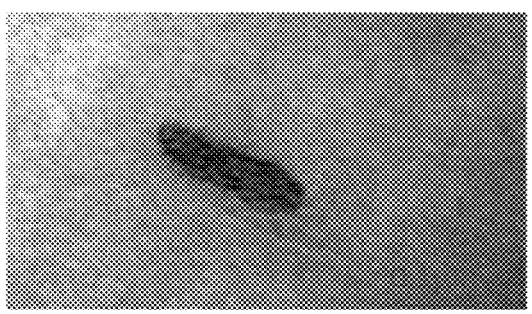

From FIG. 3, FIG. 4, and FIG. 5, which show a SEM micrograph of the seal layer surface of the Example 4, an EDX mapping photograph of the seal layer surface of the Example 4, and a TEM micrograph of the seal layer cross-section of the Example 4, respectively, it can be assumed that dimethylsiloxane was finely dispersed in the Example 4. The reason is that since the silylated polyolefin of the Example 4 was a copolymer of dimethylsiloxane and polyethylene, the dimethylsiloxane was unlikely to separate from the polyethylene, and therefore, the dimethylsiloxane was only finely dispersed, while it had a micro phase separation structure.

Figure 6:
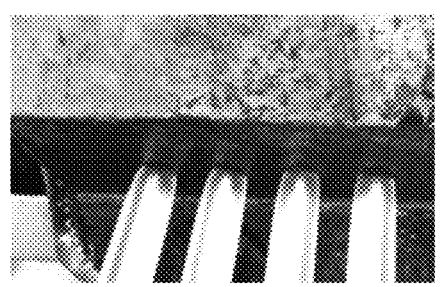
FIG. 6 shows photographs of an area around nozzles of a die of an extruder.
Figure 6:
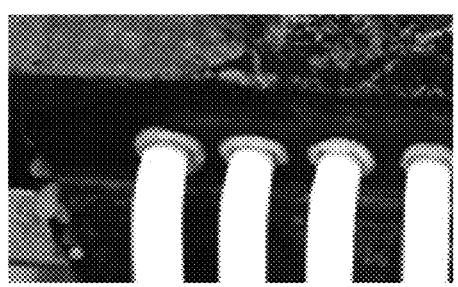

FIG. 6, which shows the situation around the plurality of nozzles disposed in the width direction of the die of the extruder when the resin composition used for the seal layer of the Example 4 was extruded from the nozzles, shows no compound deposition, and therefore, it can be understood that the silylated polyolefin in the seal layer did not deposit on the surface of the seal layer.

Comparative Examples 1 to 5

Sealant films were obtained in the same manner as the Example 1 except using compounds shown in Table 2 as raw materials for resin compositions of the seal layer, the laminate layer, and the intermediate layer.

The sealant film obtained in the Comparative Example 1 was superior in liquid repellent properties and heat seal strength, however, it had a high blocking value and high kinetic friction coefficient, and was inferior as a sealant film.

The sealant film obtained in the Comparative Example 2 was superior in liquid repellent properties and had high heat seal strength, however, it had a high blocking value and high kinetic friction coefficient, and was inferior as a sealant film.

The sealant film obtained in the Comparative Example 3 was superior in heat seal strength, however, it exhibited no liquid repellent properties, and had a high blocking value and high kinetic friction coefficient, and was inferior as a sealant film.

The sealant film obtained in the Comparative Example 4 had high heat seal strength and a low kinetic friction coefficient, however, it exhibited no liquid repellent properties and inferior as a sealant film. In addition, it had a rather high blocking value.

The sealant film obtained in the Comparative Example 5 was superior in liquid repellent properties and has a low blocking value and low kinetic friction coefficient, however, compounds from the seal layer were easy to deposit, and it was inferior as a sealant film. In addition, it had rather low heat seal strength.

FIG. 3, FIG. 4, and FIG. 5, which show a SEM micrograph of the seal layer surface of the Comparative Example 5, an EDX mapping photograph of the seal layer surface of the Comparative Example 5, and a TEM micrograph of the seal layer cross-section of the Comparative Example 5, respectively, show that in the sealant film of the Comparative example 5, silicone resin having a coarse spherical shape was dispersed.

FIG. 6, which shows the situation around the plurality of nozzles disposed in the width direction of the die of the extruder when the resin composition used for the seal layer of the Comparative Example 5 was extruded from the nozzles, shows compound deposition, which is considered to be silicone resin in the seal layer that has deposited on the surface of the seal layer.

TABLE 1

| | | | Example 1 | Example 2 | Example 3 | Example 4 | Example 5 | Example 6 | Example 7 |
|---|---|---|---|---|---|---|---|---|---|
| Raw material and conent of the seal layer | 1020L (density: 909 kg/m$^3$) *including 1020L included in organic lubricant in MB and silicone resin in MB | [wt %] | 0 | 0 | 0 | 0 | 0 | 48.15 | 0 |
| | FV405 (density: 920 kg/m$^3$) *including FV405 included in organic luricant in MB and silicone resin in MB | [wt %] | 88.15 | 68.15 | 58.15 | 48.15 | 8.15 | | 48.3 |
| | Exfola LL 1513 | [wt %] | 10 | 30 | 40 | 50 | 90 | 50 | 50 |
| | G-501 (density: 920 kg/m$^3$) | [wt %] | 0 | 0 | 0 | 0 | 0 | 0 | 0 |
| | Spherical-shaped silica (KMP 130-10, average particle diameter: 10 μm) | [wt %] | 1.2 | 1.2 | 1.2 | 1.2 | 1.2 | 1.2 | 1.2 |
| | Diatomous earth (Dicalite WF, average particle diameter: 5 μm) | [wt %] | 0.5 | 0.5 | 0.5 | 0.5 | 0.5 | 0.5 | 0.5 |
| | Erucamide | [wt %] | 0.05 | 0.05 | 0.05 | 0.05 | 0.05 | 0.05 | 0 |
| | Ethylenebis oleic amide | [wt %] | 0.10 | 0.10 | 0.10 | 0.10 | 0.10 | 0.10 | 0 |
| Raw material and content of the intermediate layer | FV405 (density: 923 kg/m$^3$) | [wt %] | 99.96 | 99.96 | 99.96 | 99.96 | 99.96 | 99.96 | 100 |
| | Erucamide | [wt %] | 0.02 | 0.02 | 0.02 | 0.02 | 0.02 | 0.02 | 0 |
| | Ethylenebis oleic amide | [wt %] | 0.02 | 0.02 | 0.02 | 0.02 | 0.02 | 0.02 | 0 |

TABLE 1-continued

|  |  |  | Example 1 | Example 2 | Example 3 | Example 4 | Example 5 | Example 6 | Example 7 |
|---|---|---|---|---|---|---|---|---|---|
| Raw material and content of the laminate | FV407 (density: 930 kg/m$^3$) | [wt %] | 100 | 100 | 100 | 100 | 100 | 100 | 100 |
| Film properties | Layer thickness (μm) Seal layer/Intermediate layer/Laminate layer | [μm] | 8/28/4 | 8/28/4 | 8/28/4 | 8/28/4 | 8/28/4 | 8/28/4 | 8/28/4 |
|  | Calculated value of average Si concentration (Si/C) | [—] | 0.0015 | 0.0045 | 0.0060 | 0.0076 | 0.0139 | 0.0076 | 0.0076 |
|  | Measured value of surface Si concentration (Si/C) | [—] | 0.0899 | 0.1339 | 0.1422 | 0.1483 | 0.1628 | 0.1483 | 0.1483 |
|  | Measure value of surface Si concentration (Si/C)/ Calculated value of average Si concentration (Si/C) | [—] | 60 7 | 29.8 | 23.6 | 19.6 | 11.7 | 19.6 | 19.6 |
|  | Arithmetic average roughness Ra | [μm] | 0.16 | 0.16 | 0.16 | 0.16 | 0.16 | 0.16 | 0.17 |
|  | Maximum peak height routhness Rz | [μm] | 19.6 | 19.6 | 19.6 | 19.6 | 19.6 | 19.6 | 16.4 |
|  | Young's modulus (in the longitudinal direction) | [MPa] | 170 | 170 | 170 | 170 | 170 | 170 | 170 |
|  | Young's modulus (in the width direction) | [MPa] | 180 | 180 | 180 | 180 | 180 | 180 | 180 |
|  | Haze (%) | [%] | 4.2 | 4.2 | 4.2 | 4.2 | 4.2 | 4.2 | 4.2 |
|  | Residual volume of adhering contents Dietary oil (Nisshin salad oil) | [g/25 cm$^2$] | 0.03 | 0.02 | 0.02 | 0.02 | 0.02 | 0.02 | 0.03 |
|  | Residual volume of adhering contents Tonkatsu sauce (Kagome Tonkatsu sauce jukusei) | [g/25 cm$^2$] | 0.80 | 0.77 | 0.77 | 0.77 | 0.77 | 0.77 | 0.70 |
|  | Residual volume of adhering contents Soy sauce (Kikkoman koikuchi soy sauce) | [g/25 cm$^2$] | 0.08 | 0.07 | 0.07 | 0.07 | 007 | 0.07 | 0.08 |
|  | Kinetic friction coefficient Seal layer/Seal layer | [—] | 0.3 | 0.3 | 0.3 | 0.3 | 0.3 | 0.3 | 0.8 |
|  | Kinetic friction coefficient Seal layer/Laminate layer | [—] | 0.6 | 0.6 | 0.6 | 0.6 | 0.6 | 0.6 | 3.0 |
|  | Heat seal strength (N/15 mm) | [N/15 mm] | 50 | 46 | 46 | 46 | 46 | 46 | 47 |
|  | Anti-blocking strength (mN/70 mm) | [mN/70 mm] | 44 | 44 | 44 | 44 | 40 | 44 | 200 |
|  | Likelihood of deposition of compound from the seal layer | Good or Bad | Good | Good | Good | Good | Good | Good | Good |

TABLE 2

|  |  |  | Comparative Example 1 | Comparative Example 2 | Comparative Example 3 | Comparative Example 4 | Comparative Example 5 |
|---|---|---|---|---|---|---|---|
| Raw material and conent of the seal layer | 1020L (density: 909 kg/m$^3$) *including 1020L included in organic lubricant in MB and silicone resin in MB | [wt %] | 0 | 0 | 0 | 0 | 0 |
|  | FV405 (density: 920 kg/m$^3$) *including FV405 included in organic luricant in MB and silicone resin in MB | [wt %] | 50 | 49.85 | 100 | 98.15 | 88.15 |
|  | Exfola LL 1513 | [wt %] | 50 | 50 | 0 | 0 | 0 |
|  | G-501 (density: 920 kg/m$^3$) | [wt %] | 0 | 0 | 0 | 0 | 10 |
|  | Spherical-shaped silica (KMP 130-10, average particle diameter: 10 μm) | [wt %] | 0 | 0 | 0 | 1.2 | 1.2 |
|  | Diatomous earth (Dicalite WF, average particle diameter: 5 μm) | [wt %] | 0 | 0 | 0 | 0.5 | 0.5 |
|  | Erucamide | [wt %] | 0 | 0.05 | 0 | 0.05 | 0.05 |
|  | Ethylenebis oleic amide | [wt %] | 0 | 0.10 | 0 | 0.10 | 0.10 |
| Raw material and content of the intermediate layer | FV405 (density: 923 kg/m$^3$) | [wt %] | 100 | 99.96 | 100 | 99.96 | 99.96 |
|  | Erucamide | [wt %] | 0 | 0.02 | 0 | 0.02 | 0.02 |
|  | Ethylenebis oleic amide | [wt %] | 0 | 0.02 | 0 | 0.02 | 0.02 |
| Raw material and content of the laminate | FV407 (density: 930 kg/m$^3$) | [wt %] | 100 | 100 | 100 | 100 | 100 |
| Film properties | Layer thickness (μm) Seal layer/Intermediate layer/Laminate layer | [μm] | 8/28/4 | 8/28/4 | 8/28/4 | 8/28/4 | 8/28/4 |
|  | Calculated value of average Si concentration (Si/C) | [—] | 0.0076 | 0.0076 | 0 | 0 | 0.0210 |

TABLE 2-continued

|  |  | Comparative Example 1 | Comparative Example 2 | Comparative Example 3 | Comparative Example 4 | Comparative Example 5 |
|---|---|---|---|---|---|---|
| Measured value of surface Si concentration (Si/C) | [—] | 0.1483 | 0.1483 | 0 | 0 | 0.1556 |
| Measure value of surface Si concentration (Si/C)/Calculated value of average Si concentration (Si/C) | [—] | 19.6 | 19.6 | error | error | 7.4 |
| Arithmetic average roughness Ra | [μm] | 0.05 | 0.05 | 0.05 | 0.14 | 0.15 |
| Maximum peak height routhness Rz | [μm] | 2.2 | 2.3 | 2.2 | 14.8 | 19.4 |
| Young's modulus (in the longitudinal direction) | [MPa] | 170 | 170 | 175 | 165 | 165 |
| Young's modulus (in the width direction) | [MPa] | 180 | 180 | 185 | 180 | 180 |
| Haze (%) | [%] | 3.0 | 3.1 | 2.6 | 4.1 | 4.1 |
| Residual volume of adhering contents Dietary oil (Nisshin salad oil) | [g/25 cm$^2$] | 0.04 | 0.03 | 0.13 | 0.08 | 0.4 |
| Residual volume of adhering contents Tonkatsu sauce (Kagome Tonkatsu sauce jukusei) | [g/25 cm$^2$] | 0.61 | 0.78 | 0.79 | 0.88 | 0.79 |
| Residual volume of adhering contents Soy sauce (Kikkoman koikuchi soy sauce) | [g/25 cm$^2$] | 0.05 | 0.08 | 0.15 | 0.10 | 0.08 |
| Kinetic friction coefficient Seal layer/Seal layer | — | 5 or more | 4.5 | 5 or more | 0.3 | 0.3 |
| Kinetic friction coefficient Seal layer/Laminate layer | — | 5 or more | 2.4 | 5 or more | 0.6 | 0.7 |
| Heat seal strength (N/15 mm) | [N/15 mm] | 48 | 46 | 52 | 55 | 45 |
| Anti-blocking strength (mN/70 mm) | [mN/70 mm] | 4000 | 100 | 5000 | 80 | 35 |
| Likelihood of deposition of compound from the seal layer | Good or Bad | Good | Good | Good | Good | Bad |

Example 8

Linear low density polyethylene resin (trade name: ULTZEX (R) 1020L manufacture by Prime Polymer Co., Ltd.), a mixture of linear low density polyethylene resin and triblock polymer of polyethylene and silicone represented by the following chemical formula (7) as silylated polyolefin (trade name: Exfola LL1513 manufactured by Mitsui Fine Chemical Inc., including 30% by weight of triblock polymer of polyethylene and silicone, including 70% by weight of metallocene-based linear low density polyethylene, density: 921 kg/m$^3$, MFR: 30 g/10 min., melting point: 121° C.), synthetic silica particles having a weight average particle diameter of 4 μm, diatomous earth having a weight average particle diameter of 5 μm, and ethylenebisoleamide and erucamide, both of which were added as a masterbatch (EMB11, XA1029, respectively), were mixed with a biaxial extruder in such a way that each content had the content ratio shown in Table 3 to produce a sealant layer.

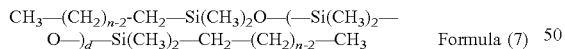  Formula (7)

(In the formula, d is 23, and n is 200.)

In addition, linear low density polyethylene resin (Sumikathene (R) E, FV407 manufactured by Sumitomo Chemical Co., Ltd.) was made into the laminate layer.

Using a multi-layered film forming apparatus, the sealant layer and the laminate layer were coextruded with a T-die, and placed on a cooling roll to produce a multi-layered film under the following conditions:
Diameter of the extruder for the sealant layer: 60 mm
Diameter of the extruder for the laminate layer: 90 mm
Width of the T-die: 1600 mm
Haul-off speed: 20 m/min.
Cooling temperature: 40° C.
Thickness of each layer
Sealant layer: 8 μm
Laminate layer: 32 μm Examples 9 to 12

As shown in the Table 3, a laminate was obtained in the same manner as the Example 8 except altering the content ratio of the linear low density polyethylene resin and the content ratio of the triblock polymer of polyethylene and silicone.

Example 13

As shown in the Table 3, a laminate was obtained in the same manner as the Example 9 except not using diatomous earth, ethylenebisoleamide, and erucamide, and altering the content ratio.

Example 14

As shown in the Table 3, a laminate was obtained in the same manner as the Example 13 except using more amount of the synthetic silica particles, and altering the content ratio.

Example 15

As shown in the Table 3, a laminate was obtained in the same manner as the Example 8 except not using ethylenebisoleamide, and erucamide, and altering the content ratio.

The sealant films obtained in the Examples 8 to 15 were superior in liquid repellent properties and heat seal properties.

In addition, they were small in kinetic friction coefficient and blocking value, and exhibited remarkably stable slipperiness and anti-blocking effect.

Comparative Example 6

As shown in the Table 3, a laminate was obtained using the same forming apparatus as the Example 8 except using only linear low density polyethylene resin (trade name: ULTZEX (R) 1020L manufactured by Prime Polymer Co., Ltd.) to produce the sealant layer, and using linear low density polyethylene resin (Sumikathene (R) E, FV407 manufactured by Sumitomo Chemical Co., Ltd.) to produce the laminate layer.

Comparative Example 7

As shown in the Table 3, a laminate was obtained in the same manner as the Comparative example 6 except mixing triblock polymer of polyethylene and silicone (trade name: Exfola manufactured by Mitsui Chemical Inc.) into linear low density polyethylene resin to produce the sealant layer, and using linear low density polyethylene resin (Sumikathene (R) E, FV407 manufactured by Sumitomo Chemical Co., Ltd.) to produce the laminate layer.

Comparative Example 8

As shown in the Table 3, a laminate was obtained in the same manner as the Comparative Example 6 except mixing triblock polymer of polyethylene and silicone, ethylenebisoleamide, and erucamide into linear low density polyethylene resin to produce the sealant layer, and using linear low density polyethylene resin (Sumikathene (R) E, FV407 manufactured by Sumitomo Chemical Co., Ltd.) to produce the laminate layer.

Comparative Example 9

As shown in the content ratio in the Table 3, a laminate was obtained in the same manner as the Comparative example 6 except mixing synthetic silica, diatomous earth, ethylenebisoleamide, and erucamide into linear low density polyethylene resin to produce the sealant layer, and using linear low density polyethylene resin (Sumikathene (R) E, FV407 manufactured by Sumitomo Chemical Co., Ltd.) to produce the laminate layer.

The sealant films obtained in the Comparative examples 6 and 7 were superior in heat seal strength, however, inferior in liquid repellent properties, and had a high blocking value and high kinetic friction coefficient.

The sealant film obtained in the Comparative Example 8 was superior in liquid repellent properties, however, inferior in heat seal strength.

The sealant film obtained in the Comparative Example 9 was superior in heat seal strength, however, inferior in liquid repellent properties.

TABLE 3

| | | | Example 8 | Example 9 | Example 10 | Example 11 | Example 12 | Example 13 |
|---|---|---|---|---|---|---|---|---|
| Resin comosition of the seal layer | Linear low density polyethylene resin | [wt %] | 68.22 | 83.32 | 90.72 | 92.22 | 95.22 | 83.84 |
| | Silylated polyolefin | [wt %] | 30.00 | 15.00 | 7.50 | 6.00 | 3.00 | 15.00 |
| | Synthetic silica particles | [wt %] | 1.16 | 1.16 | 1.16 | 1.16 | 1.16 | 1.16 |
| | Diatomous earth | [wt %] | 0.50 | 0.50 | 0.50 | 0.50 | 0.50 | 0.00 |
| | Ethylenebis oleic amide | [wt %] | 0.10 | | 0.10 | 0.10 | 0.10 | 0.00 |
| | Erucamide | [wt %] | 0.02 | 0.02 | 0.02 | 0.02 | 0.02 | 0.00 |
| Resin composition of the laminate layer | Linear low density polyethylene resin | [wt %] | 100 | 100 | 100 | 100 | 100 | 100 |
| Film properties | Arithmetic average roughness Ra | [μm] | 0.16 | 0.16 | 0.16 | 0.16 | 0.16 | 0.10 |
| | Maximum peak height roughness Sp | [μm] | 19.6 | 19.6 | 19.6 | 19.6 | 19.6 | 15.8 |
| | Kinetic friction coefficient μ d | Sealant layer/ Sealant layer | 0.3 | 0.3 | 0.3 | 0.3 | 0.4 | 0.8 |
| | | Sealant layer/ Laminate layer | 0.6 | 0.6 | 0.6 | 0.6 | 0.8 | 5 or more |
| Practical properties | Residual volume of adhering contents [g/25 cm$^2$] | Oil | 0.02 | 0.02 | 0.02 | 0.02 | 0.03 | 0.03 |
| | | Tonkatsu sauce | 0.77 | 0.77 | 0.77 | 0.77 | 0.80 | 0.96 |
| | | Soy sauce | 0.07 | 0.07 | 0.07 | 0.07 | 0.08 | 0.08 |
| | Seal strength | [N/15 mm] | 46 | 46 | 46 | 46 | 48 | 46 |
| | Blocking value | [mN] | 44 | 44 | 44 | 44 | 50 | 250 |

| | | | Example 14 | Example 15 | Comparative Example 6 | Comparative Example 7 | Comparative Example 8 | Comparative Example 9 |
|---|---|---|---|---|---|---|---|---|
| Resin comosition of the seal layer | Linear low density polyethylene resin | [wt %] | 83.26 | 83.34 | 100.00 | 85.00 | 84.88 | 98.22 |
| | Silylated polyolefin | [wt %] | 15.00 | 15.00 | 0 | 15.00 | 15.00 | 0.00 |
| | Synthetic silica particles | [wt %] | 1.74 | 1.16 | 0 | 0 | 0 | 1.16 |
| | Diatomous earth | [wt %] | 0.00 | 0.50 | 0 | 0 | 0 | 0.50 |
| | Ethylenebis oleic amide | [wt %] | 0.00 | 0.00 | 0 | 0 | 0.10 | 0.10 |
| | Erucamide | [wt %] | 0.00 | 0.00 | 0 | 0 | 0.02 | 0.02 |
| Resin composition of the laminate layer | Linear low density polyethylene resin | [wt %] | 100 | 100 | 100 | 100 | 100 | 100 |
| Film properties | Arithmetic average roughness Ra | [μm] | 0.15 | 0.17 | 0.05 | 0.05 | 0.05 | 0.14 |
| | Maximum peak height roughness Sp | [μm] | 16.1 | 16.4 | 2.3 | 2.2 | 2.3 | 14.8 |
| | Kinetic friction coefficient μ d | Sealant layer/ Sealant layer | 0.8 | 0.8 | 5 or more | 5 or more | 4.5 | 0.3 |
| | | Sealant layer/ Laminate layer | 2.7 | 3.0 | 5 or more | 5 or more | 2.4 | 0.6 |
| Practical properties | Residual volume of adhering contents [g/25 cm$^2$] | Oil | 0.03 | 0.03 | 0.13 | 0.04 | 0.03 | 0.08 |
| | | Tonkatsu sauce | 0.84 | 0.70 | 0.79 | 0.61 | 0.78 | 0.88 |
| | | Soy sauce | 0.08 | 0.08 | 0.15 | 0.05 | 0.08 | 0.10 |

TABLE 3-continued

| Seal strength | [N/15 mm] | 46 | 47 | 52 | 48 | 22 | 55 |
| --- | --- | --- | --- | --- | --- | --- | --- |
| Blocking value | [mN] | 240 | 200 | 5000 | 4000 | 100 | 80 |

INDUSTRIAL APPLICABILITY

The sealant film of the present invention can provide a packaging bag from which contents that may be paste-like or sticky materials showing viscosity can be easily brought out, and provide a sealant film and a laminate thereof having superior heat seal properties as well as superior slipperiness and anti-blocking effect, which makes large contributions to industry.

The invention claimed is:

1. A sealant film, comprising a seal layer consisting of a resin composition including the following (a) and (b), and the film satisfying the following (1) to (3):
   (a) polyolefin-based resin, and
   (b) silylated polyolefin resin;
   (1) an abundance ratio (Si/C) of silicon atoms Si to carbon atoms C included in the seal layer of 0.001 or more and 0.02 or less,
   (2) an abundance ratio (Si/C) of silicon atoms Si to carbon atoms C present at a surface of the seal layer of 0.05 or more and 0.2 or less, and
   (3) an arithmetic average roughness Ra of a surface of the seal layer of 0.15 μm or more and 0.5 μm or less.

2. The sealant film according to claim 1, wherein the resin composition includes (c) particles comprising inorganic oxide or synthetic resin.

3. The sealant film according to claim 1, wherein the resin composition includes (d) fatty acid ester or fatty acid amide.

4. The sealant film according to claim 1, satisfying the following (5):
   (5) A ratio of the abundance ratio (Si/C) of silicon atoms Si to carbon atoms C present at a surface of the seal layer to the abundance ratio (Si/C) of silicon atoms Si to carbon atoms C included in the seal layer of 2 or greater.

5. The sealant film according to claim 1, wherein a surface of the seal layer has a blocking value of 200 mN/70 mm or less.

6. The sealant film according to claim 1, having a multilayer structure including a seal layer, an intermediate layer, and a laminate layer, wherein the average density of the polyethylene-based resin in the seal layer ≤the average density of the polyethylene-based resin in the intermediate layer ≤the average density of the polyethylene-based resin the laminate layer.

7. A laminate, comprising the sealant film according to claim 1 and a base film.

8. A sealant film, comprising a seal layer consisting of a resin composition including the following (a) and (b), and the film satisfying the following (3) and (4):
   (a) polyolefin-based resin, and
   (b) silylated polyolefin resin;
   (3) an arithmetic average roughness Ra of a surface of the seal layer of 0.15 μm or more and 0.5 μm or less, and
   (4) the silylated polyolefin described by the following formula.

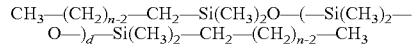

wherein d is an integer of 1 or greater, and n is an integer of 100 or greater.

9. The sealant film according to claim 8, wherein the resin composition includes (c) particles comprising inorganic oxide or synthetic resin.

10. The sealant film according to claim 8, wherein the resin composition includes (d) fatty acid ester or fatty acid amide.

11. The sealant film according to claim 8, satisfying the following (5):
    (5) A ratio of the abundance ratio (Si/C) of silicon atoms Si to carbon atoms C present at a surface of the seal layer to the abundance ratio (Si/C) of silicon atoms Si to carbon atoms C included in the seal layer of 2 or greater.

12. The sealant film according to claim 8, wherein a surface of the seal layer has a blocking value of 200 mN/70 mm or less.

13. The sealant film according to claim 8, having a multilayer structure including a seal layer, an intermediate layer, and a laminate layer, wherein the average density of the polyethylene-based resin in the seal layer ≤the average density of the polyethylene-based resin in the intermediate layer ≤the average density of the polyethylene-based resin the laminate layer.

14. A laminate, comprising the sealant film according to claim 8 and a base film.

* * * * *